US009282366B2

(12) United States Patent
Nielsen

(10) Patent No.: US 9,282,366 B2
(45) Date of Patent: Mar. 8, 2016

(54) METHODS AND APPARATUS TO COMMUNICATE AUDIENCE MEASUREMENT INFORMATION

(75) Inventor: Christen Nielsen, Palm Harbor, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

(21) Appl. No.: 13/584,352

(22) Filed: Aug. 13, 2012

(65) Prior Publication Data

US 2014/0047468 A1 Feb. 13, 2014

(51) Int. Cl.
*H04H 20/14* (2008.01)
*H04N 7/16* (2011.01)
*H04N 21/44* (2011.01)
*H04N 21/442* (2011.01)
*H04N 21/45* (2011.01)
*H04N 21/61* (2011.01)
*H04N 21/658* (2011.01)
*H04N 21/8358* (2011.01)

(52) U.S. Cl.
CPC ... *H04N 21/44008* (2013.01); *H04N 21/44204* (2013.01); *H04N 21/44222* (2013.01); *H04N 21/4532* (2013.01); *H04N 21/6181* (2013.01); *H04N 21/6582* (2013.01); *H04N 21/8358* (2013.01)

(58) Field of Classification Search
CPC .............. H04N 21/44213; H04N 21/44222; H04N 21/45; H04N 21/4508; H04N 21/4532
USPC .......................................... 725/9, 14, 62, 122
See application file for complete search history.

(56) References Cited

U.S. PATENT DOCUMENTS

| 3,056,135 | A | 9/1962 | Currey et al. |
| 4,230,990 | A | 10/1980 | Lert, Jr. et al. |
| 4,245,245 | A | 1/1981 | Matsumoto et al. |
| 4,279,433 | A | 7/1981 | Petaja |
| 4,408,345 | A | 10/1983 | Yashiro et al. |
| 4,461,241 | A | 7/1984 | Ostler |
| 4,495,496 | A | 1/1985 | Miller, III |
| 4,567,511 | A | 1/1986 | Smith et al. |

(Continued)

FOREIGN PATENT DOCUMENTS

| AU | 2006203639 | 9/2006 |
| AU | 2013205736 | 5/2013 |

(Continued)

OTHER PUBLICATIONS

The Nielsen Company, "Nielsen Unveils New Online Advertising Measurement," Sep. 27, 2010, retrieved from <http://nielsen.com/us/en/insights/press room/2010/nielsen_unveils_newonlineadvertisingmeasurement.html>, retrieved on May 31, 2012 (3 pages).

(Continued)

*Primary Examiner* — James R Sheleheda
(74) *Attorney, Agent, or Firm* — Hanley, Flight & Zimmerman, LLC

(57) ABSTRACT

Methods and apparatus to communicate audience measurement information are disclosed. An example method includes analyzing a plurality of media identifiers collected over a first period of time to identify a dominant one of the media identifiers for the first period of time; and communicating the dominant media identifier for the first period of time via a text-only messaging service to a storage facility.

19 Claims, 8 Drawing Sheets

(56) References Cited

U.S. PATENT DOCUMENTS

| | | |
|---|---|---|
| 4,647,974 A | 3/1987 | Butler et al. |
| 4,658,357 A | 4/1987 | Carroll et al. |
| 4,677,466 A | 6/1987 | Lert, Jr. et al. |
| 4,688,026 A | 8/1987 | Scribner et al. |
| 4,697,209 A | 9/1987 | Kiewit et al. |
| 4,745,468 A | 5/1988 | Von Kohorn |
| 4,814,751 A | 3/1989 | Hawkins et al. |
| 4,833,452 A | 5/1989 | Currier |
| 4,853,692 A | 8/1989 | Wolk et al. |
| 4,876,592 A | 10/1989 | Von Kohorn |
| 4,876,736 A | 10/1989 | Kiewit |
| 4,899,135 A | 2/1990 | Ghahariiran |
| 4,926,255 A | 5/1990 | Von Kohorn |
| 4,930,011 A | 5/1990 | Kiewit |
| 4,943,963 A | 7/1990 | Waechter et al. |
| 4,955,000 A | 9/1990 | Nastrom |
| 4,972,503 A | 11/1990 | Zurlinden |
| 4,990,892 A | 2/1991 | Guest et al. |
| 5,006,830 A | 4/1991 | Merritt |
| 5,019,899 A | 5/1991 | Boles et al. |
| 5,023,929 A | 6/1991 | Call |
| 5,062,151 A | 10/1991 | Shipley |
| 5,070,329 A | 12/1991 | Jasinaki |
| 5,081,680 A | 1/1992 | Bennett |
| 5,086,290 A | 2/1992 | Murray et al. |
| 5,119,104 A | 6/1992 | Heller |
| 5,146,231 A | 9/1992 | Ghaem et al. |
| 5,155,591 A | 10/1992 | Wachob |
| 5,210,820 A | 5/1993 | Kenyon |
| 5,266,944 A | 11/1993 | Carroll et al. |
| 5,278,988 A | 1/1994 | Dejean et al. |
| 5,291,399 A | 3/1994 | Chaco |
| 5,317,309 A | 5/1994 | Vercellotti et al. |
| 5,357,254 A | 10/1994 | Kah, Jr. |
| 5,359,697 A | 10/1994 | Smith et al. |
| 5,387,993 A | 2/1995 | Heller et al. |
| 5,396,224 A | 3/1995 | Dukes et al. |
| 5,396,227 A | 3/1995 | Carroll et al. |
| 5,410,344 A | 4/1995 | Graves et al. |
| 5,425,100 A | 6/1995 | Thomas et al. |
| 5,436,653 A | 7/1995 | Ellis et al. |
| 5,455,560 A | 10/1995 | Owen |
| 5,461,390 A | 10/1995 | Hoshen |
| 5,465,082 A | 11/1995 | Chaco |
| 5,471,404 A | 11/1995 | Mazer |
| 5,475,367 A | 12/1995 | Prevost |
| 5,481,294 A | 1/1996 | Thomas et al. |
| 5,483,276 A | 1/1996 | Brooks et al. |
| 5,512,933 A | 4/1996 | Wheatley et al. |
| 5,515,426 A | 5/1996 | Yacenda et al. |
| 5,548,637 A | 8/1996 | Heller et al. |
| 5,550,928 A | 8/1996 | Lu et al. |
| 5,561,412 A | 10/1996 | Novak et al. |
| 5,568,119 A | 10/1996 | Schipper et al. |
| 5,574,962 A | 11/1996 | Fardeau et al. |
| 5,584,050 A | 12/1996 | Lyons |
| 5,588,005 A | 12/1996 | Ali et al. |
| 5,594,786 A | 1/1997 | Chaco et al. |
| 5,594,934 A | 1/1997 | Lu et al. |
| 5,621,388 A | 4/1997 | Sherburne et al. |
| 5,635,907 A | 6/1997 | Bernard et al. |
| 5,636,245 A | 6/1997 | Ernst et al. |
| 5,640,192 A | 6/1997 | Garfinkle |
| 5,650,769 A | 7/1997 | Campana, Jr. |
| 5,650,770 A | 7/1997 | Schlager et al. |
| 5,659,366 A | 8/1997 | Kerman |
| 5,675,371 A | 10/1997 | Barringer |
| 5,675,510 A | 10/1997 | Coffey et al. |
| 5,682,139 A | 10/1997 | Pradeep et al. |
| 5,686,888 A | 11/1997 | Welles, II et al. |
| 5,686,902 A | 11/1997 | Reis et al. |
| 5,689,229 A | 11/1997 | Chaco et al. |
| 5,691,980 A | 11/1997 | Welles, II et al. |
| 5,699,038 A | 12/1997 | Ulrich et al. |
| 5,705,980 A | 1/1998 | Shapiro |
| 5,708,421 A | 1/1998 | Boyd |
| 5,715,325 A | 2/1998 | Bang et al. |
| 5,717,717 A | 2/1998 | Yang et al. |
| 5,719,634 A | 2/1998 | Keery et al. |
| 5,729,829 A | 3/1998 | Talwar et al. |
| 5,731,757 A | 3/1998 | Layson, Jr. |
| 5,734,413 A | 3/1998 | Lappington et al. |
| 5,737,363 A | 4/1998 | Dinkins |
| 5,742,237 A | 4/1998 | Bledsoe |
| 5,751,246 A | 5/1998 | Hertel |
| 5,754,939 A | 5/1998 | Herz et al. |
| 5,760,704 A | 6/1998 | Barton et al. |
| 5,793,290 A | 8/1998 | Eagleson et al. |
| 5,808,564 A | 9/1998 | Simms et al. |
| 5,812,056 A | 9/1998 | Law |
| 5,815,671 A | 9/1998 | Morrison |
| 5,822,418 A | 10/1998 | Yacenda et al. |
| 5,822,544 A | 10/1998 | Chaco et al. |
| 5,828,402 A | 10/1998 | Collings |
| 5,838,223 A | 11/1998 | Gallant et al. |
| 5,841,978 A | 11/1998 | Rhoads |
| 5,848,155 A | 12/1998 | Cox |
| 5,850,249 A | 12/1998 | Massetti et al. |
| 5,867,205 A | 2/1999 | Harrison |
| 5,872,588 A | 2/1999 | Aras et al. |
| 5,880,789 A | 3/1999 | Inaba |
| 5,889,548 A | 3/1999 | Chan |
| 5,893,067 A | 4/1999 | Bender et al. |
| 5,917,425 A | 6/1999 | Crimmins et al. |
| 5,918,223 A | 6/1999 | Blum et al. |
| 5,920,641 A | 7/1999 | Ueberreiter et al. |
| 5,930,369 A | 7/1999 | Cox et al. |
| 5,956,716 A | 9/1999 | Kenner et al. |
| 5,966,120 A | 10/1999 | Arazi et al. |
| 5,973,683 A | 10/1999 | Cragun et al. |
| 5,974,299 A | 10/1999 | Massetti |
| 5,982,808 A | 11/1999 | Otto |
| 5,987,306 A | 11/1999 | Nilsen et al. |
| 6,002,918 A | 12/1999 | Heiman et al. |
| 6,009,333 A | 12/1999 | Chaco |
| 6,052,730 A | 4/2000 | Felciano et al. |
| 6,052,734 A | 4/2000 | Ito et al. |
| 6,058,289 A | 5/2000 | Gardner et al. |
| 6,061,793 A | 5/2000 | Tewfik et al. |
| 6,072,984 A | 6/2000 | Barringer |
| 6,104,295 A | 8/2000 | Gaisser et al. |
| 6,184,918 B1 | 2/2001 | Goldschmidt Iki et al. |
| 6,208,735 B1 | 3/2001 | Cox et al. |
| 6,259,355 B1 | 7/2001 | Chaco et al. |
| 6,275,166 B1 | 8/2001 | Del Castillo et al. |
| 6,286,036 B1 | 9/2001 | Rhoads |
| 6,286,140 B1 | 9/2001 | Ivanyi |
| 6,300,880 B1 | 10/2001 | Sitnik |
| 6,308,045 B1 | 10/2001 | Wright et al. |
| RE37,531 E | 1/2002 | Chaco et al. |
| 6,359,557 B2 | 3/2002 | Bilder |
| 6,363,159 B1 | 3/2002 | Rhoads |
| 6,381,577 B1 | 4/2002 | Brown |
| 6,389,055 B1 | 5/2002 | August et al. |
| 6,400,827 B1 | 6/2002 | Rhoads |
| 6,411,725 B1 | 6/2002 | Rhoads |
| 6,421,445 B1 | 7/2002 | Jensen et al. |
| 6,430,498 B1 | 8/2002 | Maruyama et al. |
| 6,433,689 B1 | 8/2002 | Hovind et al. |
| 6,434,614 B1 | 8/2002 | Blumenau |
| 6,460,079 B1 | 10/2002 | Blumenau |
| 6,487,564 B1 | 11/2002 | Asai et al. |
| 6,487,719 B1 | 11/2002 | Itoh et al. |
| 6,505,160 B1 | 1/2003 | Levy et al. |
| 6,512,836 B1 | 1/2003 | Xie et al. |
| 6,523,175 B1 | 2/2003 | Chan |
| 6,529,952 B1 | 3/2003 | Blumenau |
| 6,539,095 B1 | 3/2003 | Rhoads |
| 6,546,043 B1 | 4/2003 | Kong |
| 6,546,556 B1 | 4/2003 | Kataoka et al. |
| 6,577,238 B1 | 6/2003 | Whitesmith et al. |
| 6,606,744 B1 | 8/2003 | Mikurak |
| 6,642,966 B1 | 11/2003 | Limaye |
| 6,650,322 B2 | 11/2003 | Dai et al. |

(56) References Cited

U.S. PATENT DOCUMENTS

| | | | |
|---|---|---|---|
| 6,651,253 B2 | 11/2003 | Dudkiewicz et al. |
| 6,654,480 B2 | 11/2003 | Rhoads |
| 6,662,137 B2 | 12/2003 | Squibbs |
| 6,671,732 B1 | 12/2003 | Weiner |
| 6,671,818 B1 | 12/2003 | Mikurak |
| 6,675,383 B1 | 1/2004 | Wheeler et al. |
| 6,683,966 B1 | 1/2004 | Tian et al. |
| 6,714,683 B1 | 3/2004 | Tian et al. |
| 6,766,523 B2 | 7/2004 | Herley |
| 6,813,475 B1 | 11/2004 | Worthy |
| 6,829,368 B2 | 12/2004 | Meyer et al. |
| 6,839,539 B2 | 1/2005 | Durrant et al. |
| 6,940,403 B2 | 9/2005 | Kail, IV |
| 6,941,275 B1 | 9/2005 | Swierczek |
| 6,968,564 B1 | 11/2005 | Srinivasan |
| 6,970,886 B1 | 11/2005 | Conwell et al. |
| 7,003,731 B1 | 2/2006 | Rhoads et al. |
| 7,031,733 B2 | 4/2006 | Alminana et al. |
| 7,032,178 B1 | 4/2006 | McKnight et al. |
| 7,050,603 B2 | 5/2006 | Rhoads et al. |
| 7,055,165 B2 | 5/2006 | Connelly |
| 7,058,697 B2 | 6/2006 | Rhoads |
| 7,080,061 B2 | 7/2006 | Kabala |
| 7,086,075 B2 | 8/2006 | Swix et al. |
| 7,095,871 B2 | 8/2006 | Jones et al. |
| 7,107,009 B2 | 9/2006 | Sairanen et al. |
| 7,117,008 B2 | 10/2006 | Bajikar |
| 7,124,101 B1 | 10/2006 | Mikurak |
| 7,130,807 B1 | 10/2006 | Mikurak |
| 7,155,159 B1 | 12/2006 | Weinblatt et al. |
| 7,171,018 B2 | 1/2007 | Rhoads et al. |
| 7,174,293 B2 | 2/2007 | Kenyon et al. |
| 7,185,201 B2 | 2/2007 | Rhoads et al. |
| 7,194,752 B1 | 3/2007 | Kenyon et al. |
| 7,197,156 B1 | 3/2007 | Levy |
| 7,221,405 B2 | 5/2007 | Basson et al. |
| 7,222,071 B2 | 5/2007 | Neuhauser et al. |
| 7,227,972 B2 | 6/2007 | Brundage et al. |
| 7,254,249 B2 | 8/2007 | Rhoads et al. |
| 7,289,643 B2 | 10/2007 | Brunk et al. |
| 7,346,512 B2 | 3/2008 | Li-Chun Wang et al. |
| 7,356,700 B2 | 4/2008 | Noridomi et al. |
| 7,421,723 B2 | 9/2008 | Harkness et al. |
| 7,460,827 B2 | 12/2008 | Schuster et al. |
| 7,587,732 B2 | 9/2009 | Wright et al. |
| 7,592,908 B2 | 9/2009 | Zhang et al. |
| 7,623,823 B2 | 11/2009 | Zito et al. |
| 7,643,090 B2 | 1/2010 | Ramaswamy et al. |
| 7,647,604 B2 | 1/2010 | Ramaswamy |
| 7,650,616 B2 | 1/2010 | Lee |
| 7,712,114 B2 | 5/2010 | Ramaswamy |
| 7,783,282 B2 | 8/2010 | Wendling |
| 7,783,889 B2 | 8/2010 | Srinivasan |
| 7,788,684 B2 | 8/2010 | Petrovic et al. |
| 7,793,316 B2 | 9/2010 | Mears et al. |
| 7,827,312 B2 | 11/2010 | Ramaswamy et al. |
| 7,941,525 B1 | 5/2011 | Yavilevich |
| 8,020,179 B2 | 9/2011 | Mears et al. |
| 8,125,455 B2 | 2/2012 | Land et al. |
| 8,296,087 B2 | 10/2012 | Kalinin et al. |
| 8,327,396 B2 | 12/2012 | Ramaswamy et al. |
| 8,370,489 B2 | 2/2013 | Mazumdar et al. |
| 8,429,516 B1 | 4/2013 | Riggs et al. |
| 8,429,683 B2 * | 4/2013 | Dasgupta ........................... 725/9 |
| 8,510,375 B2 | 8/2013 | Bouazizi |
| 8,539,519 B2 | 9/2013 | Mears et al. |
| 8,713,168 B2 | 4/2014 | Heffernan et al. |
| 2001/0031066 A1 | 10/2001 | Meyer et al. |
| 2001/0044899 A1 | 11/2001 | Levy |
| 2002/0016969 A1 | 2/2002 | Kimble |
| 2002/0027682 A1 | 3/2002 | Iwasaki et al. |
| 2002/0059094 A1 | 5/2002 | Hosea et al. |
| 2002/0059218 A1 | 5/2002 | August et al. |
| 2002/0068556 A1 | 6/2002 | Brown |
| 2002/0083060 A1 | 6/2002 | Wang et al. |
| 2002/0124246 A1 | 9/2002 | Kaminsky et al. |
| 2002/0144259 A1 | 10/2002 | Gutta et al. |
| 2002/0150247 A1 | 10/2002 | Linnartz et al. |
| 2002/0152090 A1 | 10/2002 | Kobayashi et al. |
| 2002/0152459 A1 * | 10/2002 | Bates et al. ...................... 725/9 |
| 2002/0157112 A1 | 10/2002 | Kuhn |
| 2002/0162118 A1 | 10/2002 | Levy et al. |
| 2002/0174425 A1 | 11/2002 | Markel et al. |
| 2002/0197063 A1 | 12/2002 | Cho |
| 2003/0005430 A1 | 1/2003 | Kolessar |
| 2003/0021441 A1 | 1/2003 | Levy et al. |
| 2003/0039465 A1 | 2/2003 | Bjorgan et al. |
| 2003/0046385 A1 | 3/2003 | Vincent |
| 2003/0046685 A1 | 3/2003 | Srinivasan et al. |
| 2003/0070182 A1 | 4/2003 | Pierre et al. |
| 2003/0079131 A1 | 4/2003 | Reefman |
| 2003/0088674 A1 | 5/2003 | Ullman et al. |
| 2003/0097302 A1 | 5/2003 | Overhultz et al. |
| 2003/0108200 A1 | 6/2003 | Sako |
| 2003/0121041 A1 | 6/2003 | Mineyama |
| 2003/0172376 A1 | 9/2003 | Coffin, III |
| 2003/0177488 A1 | 9/2003 | Smith et al. |
| 2004/0009763 A1 | 1/2004 | Stone et al. |
| 2004/0019463 A1 | 1/2004 | Kolessar et al. |
| 2004/0025174 A1 | 2/2004 | Cerrato |
| 2004/0027271 A1 | 2/2004 | Schuster et al. |
| 2004/0041703 A1 | 3/2004 | Bergman et al. |
| 2004/0064319 A1 | 4/2004 | Neuhauser et al. |
| 2004/0064351 A1 | 4/2004 | Mikurak |
| 2004/0073916 A1 | 4/2004 | Petrovic et al. |
| 2004/0122679 A1 | 6/2004 | Neuhauser et al. |
| 2004/0237096 A1 | 11/2004 | Cain et al. |
| 2004/0250281 A1 | 12/2004 | Feininger et al. |
| 2005/0028189 A1 | 2/2005 | Heine et al. |
| 2005/0033758 A1 | 2/2005 | Baxter |
| 2005/0034147 A1 | 2/2005 | Best et al. |
| 2005/0054285 A1 | 3/2005 | Mears et al. |
| 2005/0058319 A1 | 3/2005 | Rhoads et al. |
| 2005/0125820 A1 | 6/2005 | Nelson et al. |
| 2005/0141345 A1 | 6/2005 | Holm et al. |
| 2005/0144632 A1 | 6/2005 | Mears et al. |
| 2005/0177738 A1 | 8/2005 | Van Der Veen et al. |
| 2005/0207592 A1 | 9/2005 | Sporer et al. |
| 2005/0216509 A1 | 9/2005 | Kolessar et al. |
| 2006/0031297 A1 | 2/2006 | Zuidema |
| 2006/0059277 A1 | 3/2006 | Zito et al. |
| 2006/0107195 A1 | 5/2006 | Ramaswamy et al. |
| 2006/0178918 A1 | 8/2006 | Mikurak |
| 2006/0195886 A1 | 8/2006 | Ashley |
| 2006/0242325 A1 | 10/2006 | Ramaswamy et al. |
| 2007/0011040 A1 | 1/2007 | Wright et al. |
| 2007/0055987 A1 | 3/2007 | Lu et al. |
| 2007/0074020 A1 | 3/2007 | Nishimura |
| 2007/0112837 A1 | 5/2007 | Houh et al. |
| 2007/0127717 A1 | 6/2007 | Herre et al. |
| 2007/0129952 A1 | 6/2007 | Kenyon et al. |
| 2007/0136777 A1 | 6/2007 | Hasek et al. |
| 2007/0157262 A1 | 7/2007 | Ramaswamy et al. |
| 2007/0162927 A1 | 7/2007 | Ramaswamy et al. |
| 2007/0177626 A1 | 8/2007 | Kotelba |
| 2007/0186228 A1 | 8/2007 | Ramaswamy et al. |
| 2007/0186231 A1 * | 8/2007 | Haeuser et al. ................ 725/25 |
| 2007/0201835 A1 | 8/2007 | Rhoads |
| 2007/0226760 A1 | 9/2007 | Neuhauser et al. |
| 2007/0274523 A1 | 11/2007 | Rhoads |
| 2007/0288277 A1 | 12/2007 | Neuhauser et al. |
| 2007/0288476 A1 | 12/2007 | Flanagan et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0027734 A1 | 1/2008 | Zhao et al. |
| 2008/0066099 A1 | 3/2008 | Brodersen et al. |
| 2008/0082510 A1 | 4/2008 | Wang et al. |
| 2008/0082922 A1 | 4/2008 | Biniak et al. |
| 2008/0086533 A1 | 4/2008 | Neuhauser et al. |
| 2008/0091087 A1 | 4/2008 | Neuhauser et al. |
| 2008/0091451 A1 | 4/2008 | Crystal |
| 2008/0091762 A1 | 4/2008 | Neuhauser et al. |

(56) References Cited

U.S. PATENT DOCUMENTS

| | | | |
|---|---|---|---|
| 2008/0109295 A1 | 5/2008 | McConochie et al. | |
| 2008/0126420 A1 | 5/2008 | Wright et al. | |
| 2008/0133223 A1 | 6/2008 | Son et al. | |
| 2008/0139182 A1 | 6/2008 | Levy et al. | |
| 2008/0140573 A1 | 6/2008 | Levy et al. | |
| 2008/0184132 A1 | 7/2008 | Zato | |
| 2008/0204273 A1 | 8/2008 | Crystal et al. | |
| 2008/0219496 A1 | 9/2008 | Tewfik et al. | |
| 2008/0235348 A1* | 9/2008 | Dasgupta | 709/218 |
| 2008/0240490 A1 | 10/2008 | Finkelstein et al. | |
| 2008/0249961 A1 | 10/2008 | Harkness et al. | |
| 2008/0310629 A1 | 12/2008 | Van Der Veen et al. | |
| 2009/0037575 A1 | 2/2009 | Crystal et al. | |
| 2009/0070797 A1 | 3/2009 | Ramaswamy et al. | |
| 2009/0077597 A1 | 3/2009 | Lee | |
| 2009/0254943 A1* | 10/2009 | Maynard et al. | 725/56 |
| 2009/0259325 A1 | 10/2009 | Topchy et al. | |
| 2009/0290852 A1 | 11/2009 | Wright | |
| 2009/0307061 A1 | 12/2009 | Monighetti et al. | |
| 2009/0307084 A1 | 12/2009 | Monighetti et al. | |
| 2010/0094897 A1 | 4/2010 | Sumrall et al. | |
| 2010/0131972 A1* | 5/2010 | Byun | 725/25 |
| 2010/0226526 A1 | 9/2010 | Modro et al. | |
| 2010/0262986 A1* | 10/2010 | Adimatyam et al. | 725/9 |
| 2010/0268540 A1 | 10/2010 | Arshi et al. | |
| 2010/0268573 A1 | 10/2010 | Jain et al. | |
| 2010/0280641 A1 | 11/2010 | Harkness et al. | |
| 2010/0299689 A1 | 11/2010 | Mears et al. | |
| 2010/0306257 A1 | 12/2010 | Levy | |
| 2011/0016231 A1 | 1/2011 | Ramaswamy et al. | |
| 2011/0075990 A1 | 3/2011 | Eyer | |
| 2011/0085526 A1 | 4/2011 | Joseph et al. | |
| 2011/0173200 A1 | 7/2011 | Yang et al. | |
| 2011/0289523 A1 | 11/2011 | Mears et al. | |
| 2012/0110027 A1 | 5/2012 | Falcon | |
| 2012/0122418 A1* | 5/2012 | Hicks, III | 455/404.1 |
| 2012/0239809 A1 | 9/2012 | Mazumdar et al. | |
| 2012/0265735 A1 | 10/2012 | McMillan et al. | |
| 2012/0272142 A1 | 10/2012 | McCollum et al. | |
| 2013/0007298 A1 | 1/2013 | Ramaswamy et al. | |
| 2013/0007794 A1 | 1/2013 | Besehanic et al. | |
| 2013/0097285 A1 | 4/2013 | van Zwol et al. | |
| 2013/0174190 A1 | 7/2013 | Ramaswamy et al. | |
| 2013/0205347 A1* | 8/2013 | Xu et al. | 725/56 |
| 2013/0226962 A1 | 8/2013 | Riggs et al. | |
| 2013/0254634 A1 | 9/2013 | Luby et al. | |
| 2013/0268623 A1 | 10/2013 | Besehanic et al. | |
| 2013/0268630 A1 | 10/2013 | Besehanic et al. | |
| 2013/0276035 A1* | 10/2013 | Walker et al. | 725/62 |
| 2013/0290508 A1 | 10/2013 | Besehanic et al. | |
| 2013/0291001 A1 | 10/2013 | Besehanic et al. | |
| 2013/0311776 A1 | 11/2013 | Besehanic | |
| 2013/0311780 A1 | 11/2013 | Besehanic | |
| 2013/0332604 A1 | 12/2013 | Seth et al. | |
| 2014/0020007 A1 | 1/2014 | Mears et al. | |
| 2014/0047467 A1* | 2/2014 | Arling et al. | 725/14 |
| 2014/0047468 A1 | 2/2014 | Nielsen | |
| 2014/0053202 A1* | 2/2014 | Selim | 725/46 |
| 2014/0123179 A1* | 5/2014 | Wang | 725/37 |
| 2014/0214772 A1 | 7/2014 | Kadayam | |
| 2014/0229629 A1 | 8/2014 | Besehanic | |
| 2014/0229970 A1 | 8/2014 | Besehanic | |
| 2014/0244828 A1 | 8/2014 | Besehanic | |

FOREIGN PATENT DOCUMENTS

| | | | |
|---|---|---|---|
| CA | 2483104 | | 11/2003 |
| CN | 1647160 | | 7/2005 |
| EP | 0231427 | | 8/1987 |
| EP | 0769749 | | 4/1997 |
| EP | 1349370 | | 10/2003 |
| EP | 1406403 | | 4/2004 |
| EP | 1307833 | | 6/2006 |
| EP | 1504445 | | 8/2008 |
| GB | 2176639 | | 12/1986 |
| JP | 2002247610 | | 8/2002 |
| JP | 2008263544 | A * | 10/2008 |
| KR | 20020037980 | | 5/2002 |
| WO | 9512278 | | 5/1995 |
| WO | 9527349 | | 10/1995 |
| WO | 9627840 | | 9/1996 |
| WO | 9702672 | | 1/1997 |
| WO | 0004662 | | 1/2000 |
| WO | 0119088 | | 3/2001 |
| WO | 0211123 | | 2/2002 |
| WO | 0217591 | | 2/2002 |
| WO | 0227600 | | 4/2002 |
| WO | 03009277 | | 1/2003 |
| WO | 03091990 | | 11/2003 |
| WO | 03094499 | | 11/2003 |
| WO | 03096337 | | 11/2003 |
| WO | 2004010352 | | 1/2004 |
| WO | 2004040416 | | 5/2004 |
| WO | 2004040475 | | 5/2004 |
| WO | 2004061699 | | 7/2004 |
| WO | 2005041109 | | 5/2005 |
| WO | 2005064885 | | 7/2005 |
| WO | 2005101243 | | 10/2005 |
| WO | 2006099612 | | 9/2006 |
| WO | 2007056532 | | 5/2007 |
| WO | 2007073484 | | 6/2007 |
| WO | 2008042953 | | 4/2008 |
| WO | 2008044664 | | 4/2008 |
| WO | 2008045950 | | 4/2008 |
| WO | 2009064561 | | 5/2009 |
| WO | 2012177866 | | 12/2012 |
| WO | 2012177870 | | 12/2012 |
| WO | 2012177872 | | 12/2012 |
| WO | 2012177874 | | 12/2012 |

OTHER PUBLICATIONS

Microsoft "Video: timed text tracks," Mar. 14, 2012, retrieved from http://msdn.microsoft.com/en-us/library/ie/hh673566(v—vs.85). aspx> retrieved on Apr. 9, 2012 (6 pages).

Albanesius, "Facebook Issues Fix for Several Tracking Cookies," PCMAG.com, Sep. 28, 2011, retrieved from <http://www.pcmag.com/article2/0,2817,2393750,00.asp> (2 pages).

Anderson, "Google to Compete with Nielsen for TV-Ratings Info?," Ars Technica, Jun. 19, 2006, retrieved from <http://arstechnica.com/old/content/2006/06/7081.ars>, retrieved on Mar. 19, 2009 (2 pages).

Apple Inc., "HTTP Live Streaming Overview," Apr. 1, 2011 (36 pages).

Apple Inc., "Timed Metadata for HTTP Live Streaming," Apr. 28, 2011 (12 pages).

Claburn, "Google Researchers Propose TV Monitoring," Information Week, Jun. 7, 2006, retrieved from <http://www.informationweek.com/news/internet/showArticle.jhtml?articleID-188702619>, retrieved on Mar. 19, 2009 (3 pages).

Coffey, "Internet Audience Measurement: A Practitioner's View," Journal of Interactive Advertising, vol. 1, No. 2, Spring 2001 (8 pages).

Cormen et al., "C Track: Assignment 7," published Sep. 14, 2004, retrieved from Internet Archive Wayback Machine, retrieved on Nov. 20, 2010 (6 pages).

Cubrilovic, "Logging Out of Facebook Is Not Enough," New Web Order, Sep. 25, 2011, retrieved from <www.nikcub.appspot.com>, (3 pages).

European Patent Office, "Annex to the European Search Report", issued in connection with European Patent Application No. EP 03815891, mailed Feb. 11, 2009 (1 page).

European Patent Office, "Decision to Refuse a European Patent Application," issued in connection with European Patent Application No. EP11010170.6, mailed May 26, 2014 (47 pages).

European Patent Office, "Communication Pursuant to Article 94(3) EPC," issued in connection with European Patent Application No. EP11010170.6, mailed Jan. 10, 2013 (16 pages).

European Patent Office, "Supplemental European Search Report," issued in connection with European Patent Application No. EP03815891.1, mailed Feb. 27, 2009 (1 page).

(56) References Cited

OTHER PUBLICATIONS

Evain, "TV-Anytime Metadata—A Preliminary Specification on Schedule!," EBU Technical Review, Sep. 2000 (14 pages).
Fliptop, "Fliptop Person API Documentation," retrieved from <https://developer.fliptop.com/documentation>, retrieved on May 7, 2013 (6 pages).
Fliptop, "What is Fliptop?", www.fliptop.com/about_us, retrieved on May 7, 2013, 1 page.
Heussner, "Sound-Triggered Smart Phone Ads Seek You Out,"Adweek.com, Dec. 7, 2011, retrieved from <http://www.adweek.com/news/advertising-branding/sound-triggered-smartphone-ads-seek-you-out-136901>,retrieved on Aug. 14, 2012 (1 page).
Hopper, "EBU Project Group P/META Metadata Exchange Standards," EBU Technical Review, Sep. 2000 (24 pages).
Indian Patent Office, "Patent Certificate" issued in connection with Indian Patent Application No. 1833/CHENP/2005, granted Dec. 1, 2008 (2 pages).
Indian Patent Office, English translation of Office action, issued in connection with Indian Patent Application No. 1833/CHENP/2005, mailed Dec. 12, 2007 (2 pages).
Kane, "Entrepreneur Plans On-Demand Videogame Service," The Wall Street Journal, Mar. 24, 2009 retrieved from <http://online wsj.com/article/SB123787473566622741.html#printMode>, retrieved on Mar. 24, 2009 (2 pages).
Launder, "Media Journal: Nielsen to Test Online-TV Viewing Tool," The Wall Street Journal, Apr. 30, 2013 (2 pages).
Laven, "EBU Technical Review Editorial: Confused by Metadata?," EBU UER Technical Review, No. 284, Sep. 2000, retrieved from <http://www.ebu.ch/en/technical/trev/trev_284-editorial.html>, retrieved on Jul. 20, 2006 (3 pages).
Mulder, "The Integration of Metadata From Production to Consumer," EBU Technical Review, Sep. 2000 (5 pages).
International Preliminary Examining Authority, "International Preliminary Examination Report," issued in connection with International Patent Application No. PCT/US03/04030, mailed Apr. 22, 2004 (9 pages).
International Searching Authority, "International Search Report," issued in connection with International Patent Application No. PCT/US03/04030, mailed Aug. 19, 2003 (4 pages).
International Preliminary Examining Authority, "Written Opinion," issued in connection with International Patent Application No. PCT/US03/04030, mailed Dec. 12, 2003 (8 pages).
Protalinski, "Facebook Denies Cookie Tracking Allegations," ZDNET, Sep. 25, 2011, retrieved from <http://www.zdnet.com/blog/facebook/facebook-denies-cookie-tracking-allegations/4044> (2 pages).
Protalinski, "Facebook Fixes Cookie Behavior After Logging Out," ZDNET, Sep. 27, 2011, retrieved from <http://www.zdnet.com/blog/facebook/facebook-fixes-cookie-behavior-after-logging-out/4120> (2 pages).
Protalinski, "US Congressmen Ask FTC to Investigate Facebook Cookies," ZDNET, Sep. 28, 2011, retrieved from <http://www.zdnet.com/blog/facebook/us-congressmen-ask-ftc-to-investigate-facebook-cookies/4218> (2 pages).
Pantos et al., "HTTP Live Streaming: draft-pantos-http-live-streaming-07," Sep. 2011 (33 pages).
Radio Ink, "Arbitron & Scarborough Unveil New Mall Shopper Audience Measurement," May 7, 2008, retrieved from <http://radioink.com/HeadlineEntry.asp?hid=135452&pt=todaynews> (1 p.).
Rapleaf, "Fast. Simple. Secure," retrieved from <http://www.rapleaf.com/why-rapleaf/>, retrieved on May 7, 2013 (3 pages).
Rapleaf, "Frequently Asked Questions," retrieved from <http://www.rapleaf.com/about-us/faq/#where>, retrieved on May 7, 2013 (3 pages).
Rapleaf, "The Consumer Data Marketplace," retrieved from <http://www.rapleaf.com/under-the-hood/>, retrieved on May 7, 2013 (2 pages).
Sharma, "Nielsen Gets Digital to Track Online TV Viewers," Wall Street Journal, Apr. 30, 2013 (3 pages).
Shazam, "Shazam and VidZone Digital Media Announce Uk1s First Fixed Price Mobile Download Service for Music Videos," Feb. 11, 2008, retrieved from <http://www.shazam.com/music/web/newsdetail.html?nid=NEWS136> (1 page).
Shazam, "Shazam Launches New Music Application for Facebook Fans," Feb. 18, 2008, retrieved from <http://www.shazam.com/music/web/newsdetail.html?nid=NEWS135>, (1 page).
Shazam, "Shazam turns up the volume on mobile music," Nov. 28, 2007, retrieved from <http://www.shazam.com/music/web/newsdetail.html?nid-NEWS137> (1 page).
Shazam, Company summary outline and list of products, date unknown (1 page).
Sullivan, "Google Cozies Up to SMBs for Digital Content," MediaPost News, Mar. 19, 2009, retrieved from <http://www.mediapost.com/publications/?fa=Articles.showArticle&art_aid=102383>, retrieved on Mar. 20, 2009 (2 pages).
Taiwanese Patent Office, "Summary of the Reasons for Rejection," issued in connection with Taiwanese Patent Application No. 92107979, dated Jul. 26, 2009 (1 page).
Taiwanese Patent Office, "Translation of the Preliminary Examination Report," issued in connection with Taiwanese Patent Application No. 92107979, mailed Jul. 19, 2007 (3 pages).
Taiwanese Patent Office, Translation of Examiner's Opinion, issued in connection with Taiwanese Patent Application No. 92107979, Oct. 30, 2007 (1 page).
Taiwanese Patent Office, "Translation of Examiners Opinion," issued in connection with Taiwanese Patent Application No. 92107979, Oct. 31, 2007 (2 pages).
United States Patent and Trademark Office, "Advisory Action," issued in connection with U.S. Appl. No. 10/867,190, mailed Feb. 24, 2009 (3 pages).
United States Patent and Trademark Office, "Final Office Action," issued in connection with U.S. Appl. No. 10/867,190, mailed Nov. 4, 2008 (16 pages).
United States Patent and Trademark Office, "Non-Final Office Action," issued in connection with U.S. Appl. No. 10/867,190, mailed Feb. 22, 2010 (18 pages).
United States Patent and Trademark Office, "Non-Final Office Action," issued in connection with U.S. Appl. No. 10/867,190, mailed Jul. 28, 2009 (17 pages).
United States Patent and Trademark Office, "Non-Final Office Action," issued in connection with U.S. Appl. No. 10/867,190, mailed May 8, 2008 (21 pages).
United States Patent and Trademark Office, "Non-Final Office Action," issued in connection with U.S. Appl. No. 13/194,657, mailed Oct. 23, 2012 (13 pages).
United States Patent and Trademark Office, "Non-Final Office Action," issued in connection with U.S. Appl. No. 12/847,805, mailed Jan. 13, 2011 (7 pages).
United States Patent and Trademark Office, "Non-Final Office Action," issued in connection with U.S. Appl. No. 13/584,352 mailed May 16, 2013 (10 pages).
United States Patent and Trademark Office, "Notice of Allowance," issued in connection with U.S. Appl. No. 10/867,190, mailed Jul. 21, 2010 (11 pages).
United States Patent and Trademark Office, "Notice of Allowance," issued in connection with U.S. Appl. No. 13/194,657, mailed May 16, 2013 (8 pages).
United States Patent and Trademark Office, "Notice of Allowance," issued in connection with U.S. Appl. No. 12/847,805, mailed May 31, 2011 (7 pages).
United States Patent and Trademark Office, "Final Office Action," issued in connection with U.S. Appl. No. 13/584,352, mailed Sep. 24, 2013 (10 pages).
Van Beek et al., "Metadata-Driven Multimedia Access," IEEE Signal Processing Magazine, vol. 20, No. 2, Institute of Electric and Electronic Engineers, Inc., New York, New York, USA, Mar. 2003 (13 pages).

(56) References Cited

OTHER PUBLICATIONS

Vega, "Nielsen Introduces New Ad Measurement Product," The New York Times, Sep. 27, 2010, retrieved from <http://mediadecoder.blogs.nytimes.com/2010/09/27/nielsen-unveils-new-ad-measurement-product>, retrieved on Oct. 4, 2011 (7 pages).

Vetro et al., "Video Transcoding Architectures and Techniques: an Overview," IEEE Signal Processing Magazine, vol. 20, No. 2, Institute of Electric and Electronic Engineers, Inc., New York, New York, USA, Mar. 2003 (12 pages).

Vranica, "Nielsen Testing a New Web-Ad Metric," The Wall Street Journal, Sep. 23, 2010 (2 pages).

Wactlar et al., "Digital Video Archives: Managing Through Metadata," Building a National Strategy for Digital Preservation: Issues in Digital Media Archiving, Apr. 2002, retrieved from <http://www.informedia.cs.cmu.edu/documents/Wactlar-CLIR-final.pdf>, (14 pages).

Wang, "An Industrial-Strength Audio Search Algorithm," Shazam Entertainment, Ltd., in Proceedings of the Fourth International Conference on Music Information Retrieval, Baltimore, Oct. 26-30, 2003 (7 pages).

Winkelman, "Timed Text Tracks and TV Services," CableLabs, Aug. 15, 2011 (5 pages).

United States Patent and Trademark Office, "Non-Final Office Action," issued in connection with U.S. Appl. No. 14/027,964, mailed Aug. 12, 2014 (48 pages).

United States Patent and Trademark Office, "Non-Final Office Action," issued in connection with U.S. Appl. No. 14/266,118, mailed Aug. 28, 2015 (18 pages).

* cited by examiner

METHODS AND APPARATUS TO COMMUNICATE AUDIENCE MEASUREMENT INFORMATION

FIELD OF THE DISCLOSURE

This disclosure relates generally to audience measurement and, more particularly, to methods and apparatus to communicate audience measurement information.

BACKGROUND

Audience measurement of media (e.g., movies, television and/or radio (broadcast, multicast, pay-per-view, Internet protocol television (IPTV), satellite, terrestrial, streamed, etc.), stored audio and/or video media played back from a memory such as a digital video recorder or a digital video disc, audio and/or video media played via the Internet, video games, etc.) often involves collection of media identifying data (e.g., signature(s), fingerprint(s), identification code(s), channel information, time of consumption information, etc.) indicative of media presented at, for example, certain locations (e.g., statistically selected households) and/or in connection with certain individuals (e.g., statistically selected people). In some instances, an entity collecting the media identifying data is also aware of one or more characteristics (e.g., demographics) of the locations and/or individuals (e.g., panelists) to which the identified media was presented. Used in combination with the known characteristic(s), the media identifying data provides information related to media exposure and/or consumption indicative of amount(s) and/or type(s) of people that were exposed to identified piece(s) of media.

DETAILED DESCRIPTION

Figure 1:
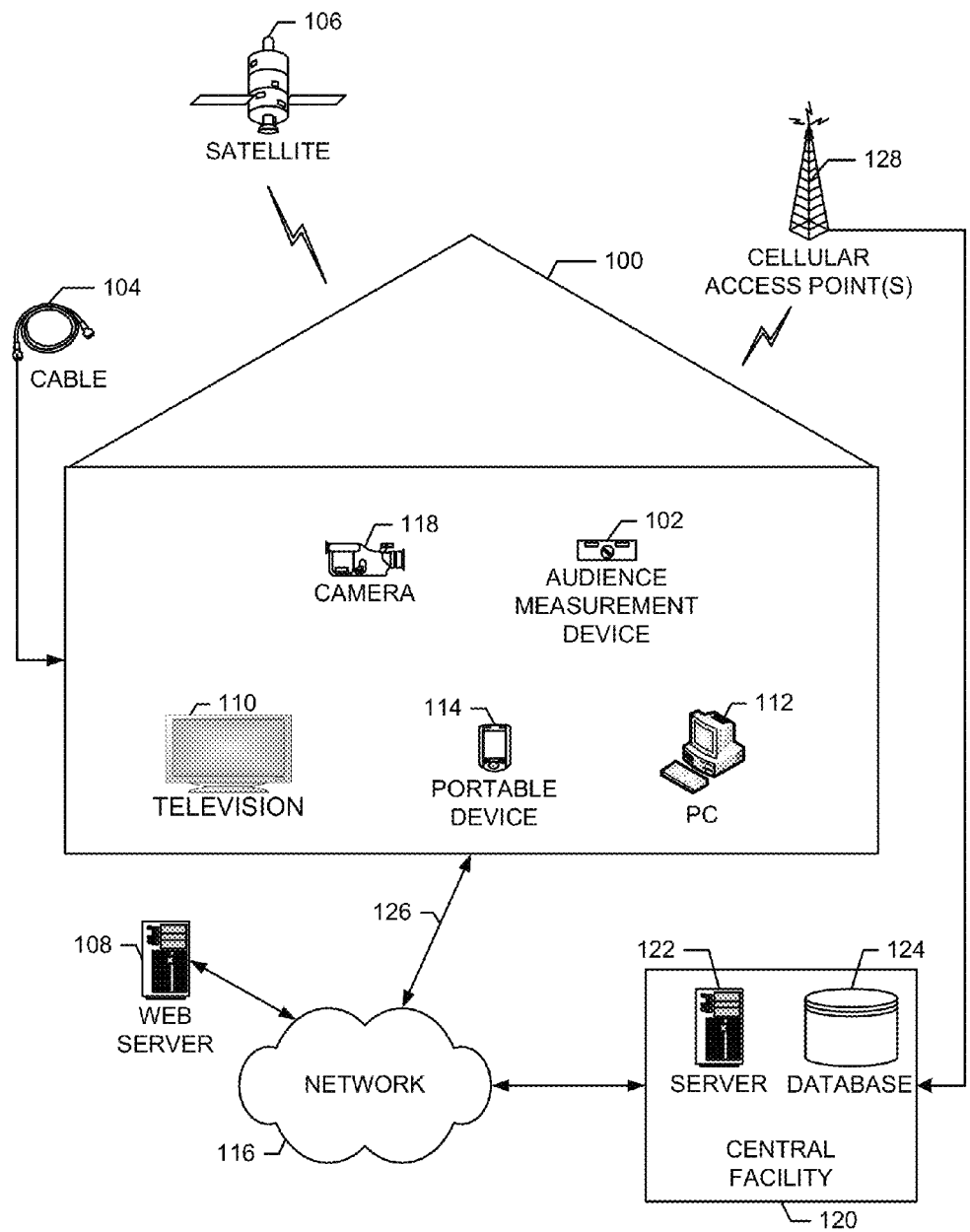
FIG. 1 is an illustration of an example communication system including an example audience measurement device constructed in accordance with teachings of this disclosure.

Audience measurement entities generate statistics that enable clients such as advertisers, media strategists, product manufacturers, etc. to target one or more demographics, populations, and/or markets. Additionally or alternatively, the clients of audience measurement entities use audience measurement statistics (e.g., ratings) to evaluate performance of media across one or more demographics and/or markets. In many instances, clients are interesting in having as much data as possible related to many demographics, populations, and/or markets. Therefore, audience measurement entities benefit from an ability to collect media exposure and/or consumption data across wide ranges of demographics, populations, and/or markets.

There are challenges in collecting sufficient amounts of accurate data to generate robust statistics from some demographics, populations, and/or markets. For example, after data is gathered at a collection site (e.g., in a living room of a house or on a portable device carried by a person), the data is typically delivered to a central facility for storage and/or analysis. For some data collection sites, such as households in major United States metropolitan areas, electronic delivery of the collected data is straightforward. For example, an in-home audience measurement device deployed in a large city has access to a readily available communication infrastructure, such as a Wide Area Network (WAN) that provides consistent quality of service. Such an audience measurement device can utilize the communication infrastructure (e.g., the Internet) to send data over communication channels having large amounts of bandwidth to frequently convey data to the central facility at any desired time of day.

On the other hand, effective and reliable electronic delivery of data to the central facility can be difficult from, for example, a data collection site located in an emerging market, a developing nation, and/or a rural geographic location having less of a communication infrastructure than, for example, a major metropolitan area in the United States. For example, in some geographic locations, reliable access to a network such as the Internet is not available, not reliably available (e.g., experiences frequent service interruptions), and/or does not provide a high enough quality of service (e.g., bandwidth) to form a basis of a plan to regularly convey data to the central facility. When a reliable wired network connection is not available to convey data to the central facility, some collection devices rely on a cellular component (e.g., modem) to communicate the collected data over a cellular network. However, using cellular components to convey audience measurement data has drawbacks. For example, some geographic locations (e.g., emerging markets, developing nations, etc.) lack a reliable cellular infrastructure and, thus, delivery of data via cellular data service is not robust or reliable enough for sending large amounts of data at frequent intervals. In some instances and/or locations, the cellular infrastructure is limited to supporting voice data and/or small amounts of text data (e.g., short messaging service (SMS)) and, thus, is incapable of sending large amounts of data over the cellular network. Moreover, cellular data services are often expensive, especially for audience measurement devices that frequently convey large amounts of data on a regular basis.

For these and other reasons, audience measurement entities have found it difficult to electronically collect audience measurement information from certain geographic locations, markets, and/or populations. Without an ability to deploy and/or rely on electronic collection, audience measurement entities attempting to collect data from such challenging sites have sometimes relied on panels of participants to fill out logs or diaries indicative of the media to which the participants are exposed. Such logs are hand written and mailed to the central facility, where the diary information is entered into an electronic database. While proven as an effective technique to collect audience measurement data, the diaries have drawbacks compared to electronic meters that automatically collect media exposure and/or consumption information. For example, some electronic meters passively record media exposure information rather than requiring active participation of the panelists. Additionally, electronic meters that require active participation of the panelists typically include a convenient user interface that is more user friendly than a paper diary. A collection device that makes data entry more convenient is more likely to result in compliance with reporting terms by the panelists. That is, electronic collection devices are more convenient to use and, thus, less likely to draw objections from potential and/or current participants, especially in emerging markets that may not be as familiar with audience measurement systems as other markets or populations. In other words, potential participants are typically more likely to agree to participant in (and/or remain in) a panel involving a convenient, passive collection device that only requires placement of the collection device in a room and/or carrying of the collection device. It has been found that active user participation, (e.g., logging in to a people meter to record a person presence in an audience) is a causal factor in individuals leaving panels. Reducing the inconvenience to panelists can be a large cost savings to audience measurement entities as it may increase the length of time persons participate in the panel and adding new persons to panels is costly. Moreover, accuracy of information provided via the manual diaries suffers from human error (e.g., writing down incorrect information, failure of memory, etc.). Accordingly, increasing the availability of electronic collection devices to potential participants for a panel is valuable to enhance the accuracy of the data.

Example methods, apparatus, and/or articles of manufacture disclosed herein enable deployment of electronic data collection devices in more populations and/or markets by improving communication capabilities of data collection devices. Examples disclosed herein provide a cost-effective, reliable technique of conveying audience measurement data from a collection site to, for example, a central facility. While examples disclosed herein can be deployed in any environment and/or in connection with any data collection device, some examples disclosed herein are particularly useful for collecting data in scenarios and/or geographic locations in which a wired network connection is unavailable and/or unreliable. Additionally, examples disclosed herein are particularly useful for collecting data in scenarios and/or geographic locations in which communicating audience measurement data via a cellular data service is insufficient (e.g., in terms of bandwidth), not cost-effective, unavailable, and/or unreliable. As a result of the improvements provided by examples disclosed herein to effectively communicate electronic data, the non-electronic collection devices (e.g., diaries) often utilized due to unavailability of reliable and/or cost-ineffective electronic communication channels can be replaced and/or supplemented with more convenient, and/or more accurate electronic collection devices.

Some examples disclosed herein utilize inexpensive plans and transmission protocols offered by cellular service providers to communicate audience measurement information, as opposed to the standard cellular data service plans used by previous systems. Providers of cellular service (e.g., proprietors of cellular networks) typically offer different plans for transmission of different types of data. Plans that enable users to send and receive data of any size to and from, for example, a web server to visit a website are referred to herein as data service plans or standard data service plans. The protocols utilized in the standard service plans (e.g., Long Term Evolution (LTE), code division multiple access (CDMA), Universal Mobile Telecommunications System (UMTS), 3G, 4G, etc.) enable transfer of large amounts of data in each packet or request. Transmission of data via standard data service plans can become expensive when large amounts of data are regularly transmitted. Previous audience measurement devices communicating over cellular networks utilized the standard data service plans to transmit audience measurement data to a central facility. The cost of doing so is a limiting factor that restricts the ability of audience measurement entities to reach geographic areas and/or markets that need to rely on cellular communication to transmit data (e.g., where wired network connections are not available).

Another type of plan and/or protocol offered by cellular service providers is a text-only plan that is limited to transmission of textual messages of a capped size. An example text-based messaging service is Short Messaging Service (SMS) in which text-only messages of a capped size (e.g., in terms of bytes) are conveyed from originating party to a destination party using a different protocol than the protocol used by the standard data service plan previously used to convey audience measurement data. Example methods, apparatus, and/or articles of manufacture disclosed herein recognize that transmission of the text-only messages via protocols like SMS is typically much less expensive than transmission of messages provided by standard data services. Additionally, example methods, apparatus, and/or articles of manufacture disclosed herein recognize that the text-only messages are more likely to be successfully transmitted over some cellular networks than messages using the protocols of standard data service plans. The higher likelihood is a result of several factors including, for example, the capped smaller size of the text-only messages and the lower complexity and/or bandwidth requirements of the protocols used to send the text-only messages relative to the standard data services. As described in detail below, examples disclosed herein take advantage of these benefits of text-only messages to more effectively and/or reliably deliver data to a central facility of an audience measurement entity, thereby enabling the audience measurement entity to cost effectively expand in or enter, for example, emerging markets having developing communication infrastructures.

FIG. 1 illustrates an example household 100 including an example audience measurement device 102 constructed in accordance with teachings disclosed herein. In the example of FIG. 1, the household 100 receives media from one or more sources such as a cable provider 104, a satellite 106, and/or a web server 108. Although multiple sources are shown in the example of FIG. 1, any subset of the sources and/or different sources may additionally or alternatively be withheld. The example household 100 of FIG. 1 includes one or more media presentation devices that render data received from one or more of the media sources 104-108 and/or any other media source(s). In the illustrated example, the household 100 includes a television 110, a personal computer 112, and/or a portable device 114 (e.g., a smart phone or tablet), which is useable inside and/or outside of the household 100 to, for example, access media and/or place telephone calls. Although multiple media devices are shown in the example of FIG. 1, any subset of the devices and/or alternative or additional devices may be present. The television 110 of the illustrated example receives television signals transmitted via a plurality of channels via the cable service 104 and/or the satellite 106. The example personal computer 112 and the example portable device 114 of FIG. 1 download media (e.g., Internet protocol television (IPTV), on-demand movies, advertisements, web videos, streaming media, etc.) from one or more web servers, such as the web server 108, via a network 116 (e.g., the Internet) and/or any other online or local (e.g., a DVD, hard drive, removable flash memory, SD card, etc.) resource of media. Further, the example personal computer 112 and the example portable device 114 render the media on a display device, such as a monitor and/or speakers in communication with the personal computer 112 and/or the portable device 114.

As described in detail below in connection with FIG. 2, the example audience measurement device 102 of FIG. 1 collects data from, for example, one or more presentations generated by one or more of the media presentation devices 110-112 of FIG. 1. Further, as described in detail below in connection with FIG. 2, the example audience measurement device 102 actively and/or passively collects information related to people exposed to the media presentations being monitored by the example audience measurement device 102. In the illustrated example, the audience measurement device 102 includes or is coupled to a camera 118, in addition to other devices and methods, to capture images of people present in a media exposure environment, such as a living room of the household 100. Data collected by the example audience measurement device 102 and/or via any other collection device of the example household 100 of FIG. 1 is conveyed to a central facility 120 associated with an audience measurement entity. The example central facility 122 of FIG. 1 includes a server 122 to analyze the received data and a database 124 to store the received data and/or results of the analyses performed by the server 122 and/or the audience measurement device 102 (e.g., the results of analyses performed at the device 102 before the collected data was conveyed to the central facility 120).

While the example household 100 of FIG. 1 includes a wired network connection 126 that can be utilized to convey collected data to the central facility 120, the example audience measurement device 102 is also in communication with one or more cellular access points (e.g., cellular towers) 128. In some examples, such as geographic locations associated with emerging markets and/or developing nations, the wired network connection 126 is not available at the household 100. The example cellular access point(s) 128 of FIG. 1 are communicatively coupled to the central facility 120 via one or more cellular networks and/or wired networks (e.g., the network 116). Thus, the example audience measurement device 102 can convey data to, for example, the central facility 120 via the cellular access point(s) 128.

Figure 2:
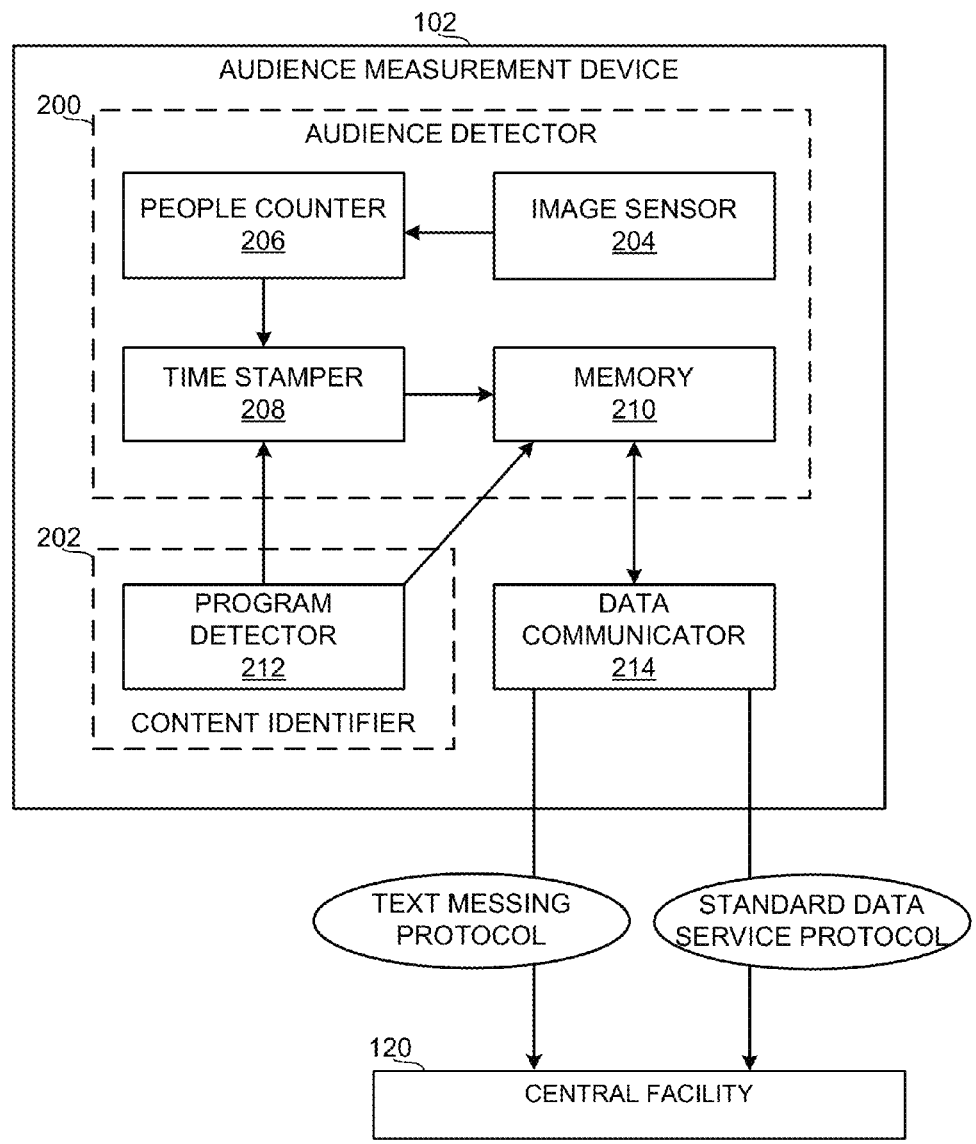
FIG. 2 is a block diagram of an example implementation of the example audience measurement device of FIG. 1 and the example central facility of FIG. 1.

FIG. 2 illustrates an example implementation of the example audience measurement device 102 of FIG. 1. In some examples, the audience measurement device 102 is implemented as an electronic device that may be shipped to the household 100 (e.g., via governmental postal service, private courier, etc.) and easily installed by the viewer by, for example, placing the audience measurement device 102 in a media exposure environment, such as a living room. The example audience measurement device 102 of FIG. 2 includes an audience detector 200 and a content identifier 202. The example audience detector 200 of FIG. 2 (also referred to as a people meter) includes a first image sensor 204 that may correspond to the example camera 118 of FIG. 1. The example audience detector 200 of FIG. 2 also includes a people counter 206, a time stamper 208, and a memory 210. The example image sensor 204 of FIG. 2 capture frames of image data of a media exposure environment of the example household 100 of FIG. 1, which may include an audience being exposed to a presentation output by one or more of the media presentation devices 104-108 of FIG. 1. In some examples, the image sensor 204 only captures frames of image data when at least one media presentation device, such as the television 110 is in an "on" state and/or when the content identifier 202 determines that media is being presented in the monitored environment. The image sensor 204 may be implemented as any suitable device such as, for example, an infrared imager or a digital camera, such as a charge-coupled device (CCD) camera or on XBOX KINECT. The frames of image data captured by the image sensor 204 are conveyed to the people counter 206. In the illustrated example of FIG. 2, the people counter 206 determines and records how many people are present in the monitored environment for a particular time using the received frames of image data. The example people counter 206 of FIG. 2 can utilize any suitable technique (e.g., blob counting, facial recognition, face detection, movement detection, etc.) to analyze the image data to generate people information (e.g., people counts, people identities, etc.). An example blob counting method is disclosed in U.S. Pat. No. 7,609,853, which is hereby incorporated by reference herein in its entirety.

In addition to or in lieu of the image data provided by the image sensor 204, the example people counter 206 can gather information related to people of a monitored environment via wearable and/or stationary identification devices (e.g., radio frequency identification (RFID) cards), each associated with a member of the household 100. The example people counter 206 can detect a presence of a wearable identification device and assume that the corresponding person is wearing the identification device. As such, the people counter 206 can determine that the corresponding person is in the monitored environment. Additionally or alternatively, the people counter 206 can receive inputs (e.g., selection (e.g., depression) of dedicated buttons) from member(s) of the household 100 to indicate that member(s) are in the monitored environment. Other techniques for detecting people and/or identities of people may additionally or alternatively be used in the example people counter 206 of FIG. 2.

The example people counter 206 of FIG. 2 outputs calculated people information and/or the corresponding frames of image data to the time stamper 208. The time stamper 208 of the illustrated example includes a clock and a calendar to time stamp information by, for example, appending a time stamp to an end of the people information and/or image data. In the example of FIG. 2, the time stamped image data and/or people information is stored in the memory 210. The memory 210 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The memory 210 may also include one or more mass storage devices such as, for example, hard drive disk(s), compact disk drive(s), digital versatile disk drive(s), etc.

In some examples, the audience measurement device 102 does not include any people metering functionality. In such examples, the image sensor 204 and/or the people counter 206 are omitted. In such instances, the example audience measurement device 102 acts as a media identifying information collection device but does not detect the presence of people in the monitored environment.

The example content identifier 202 of FIG. 2 includes a program detector 212 and a data communicator 214. The example program detector 212 of FIG. 2 detects presentation(s) of media in the monitored environment and collects identification information associated with the detected presentation(s). The program detector 212 of the illustrated example, which may be in wired and/or wireless communication with one or more of the media presentation devices 104-108 of FIG. 1, identifies a presentation time and a source of a media presentation. The presentation time and the source identification data may be utilized to identify the media by, for example, cross-referencing a program guide configured as a look up table. The example program detector 212 obtains the source identification information (e.g., the identity of a channel) by, for example, monitoring a tuner or set-top box associated with the television 110 or a digital selection (e.g., a remote control signal) of a channel to be presented on the television 110. Source identification data includes, for example, a broadcast channel identifier or an identifier associated with of a web site (e.g., a Universal Resource Locator) visited by a web browser of the personal computer 112.

Additionally or alternatively, the example program detector 212 of FIG. 2 may collect codes embedded with or otherwise transmitted with media presented via the television 110 and/or personal computer 112 to identify media. As used herein, a code is an identifier that is transmitted with the media for the purpose of identifying the corresponding media. Codes may be carried in the audio, in the video, in the metadata, in the vertical blanking interval, or in any other portion of the media. Additionally or alternatively, the example program detector 212 of FIG. 2 may collect a signature representative of a portion of the media. As used herein, a signature is a representation of some characteristic of the media (e.g., a frequency spectrum of an audio signal) that can be compared against a collection of known signatures to identify the corresponding media. The example program detector 212 of FIG. 2 can generate the signature(s) and/or collect samples of the media and export the samples to a remote site (e.g., the central facility 120 of FIG. 1) for generation of the signature(s). The example program detector 212 can utilize any additional or alternative mechanisms and/or techniques, such as watermarks embedded in the media and/or fingerprints of the media, to identify media presentation in a monitored environment. In the illustrated example, the identification information (e.g., source identification, code(s), signature(s), watermark(s), fingerprint(s), etc.) is time stamped by the time stamper 208 and stored in the memory 210.

In the illustrated example of FIG. 2, the data communicator 214 accesses the memory 210 to obtain and transmit the audience measurement information to the example central facility 120 of FIG. 1 and/or to any other site or device. As described in detail below in connection with FIGS. 3 and 4, the example data communicator 214 expands capabilities of the audience measurement device 102 to conveniently, accurately and cost-effectively communicate the audience measurement information to, for example, the central facility 120. For example, in addition to the ability to transfer data to the central facility 120 via a standard data service protocol that supports communication of large amounts of data, the example data communicator 214 provides the audience measurement device 102 with an ability to send audience measurement information via a text-only messaging protocol (e.g., SMS messaging). As described in detail below, the example data communicator 214 of FIG. 2 determines which of the protocols (e.g., the standard data service protocol or the text-only messaging protocol) to use for communication of, for example, audience measurement data to the central facility 120.

The central facility 120 analyzes the audience measurement data to create, for example, statistics related to the identified media. For example, the amount of people (as counted by the people counter 206) in the monitored exposure environment at a particular time (as indicated by a time stamp appended to people count by the time stamper 208) in which a sporting event (as identified by the program detector 212) was presented by the television 110 can be used in a rating calculation for the sporting event. The audience measurement data uploaded by the data communicator 214 may not identify the program specifically. Instead, in view of the reduced bandwidths utilized by the communication media (e.g., text messaging), the time and channel number or other identifier(s) may be uploaded which enables the central facility 120 to identify the program using, for example, a table mapping channels to programs based on time. In some examples, the central facility 120 correlates additional or alternative information (e.g., demographic data related to the household 100, geographic data related to the household 100, etc.) with the collected information to expand the usefulness of the data collected by the example audience measurement device 102 of FIGS. 1 and/or 2. As described below in connection with FIGS.

While an example manner of implementing the audience measurement device 102 of FIG. 1 has been illustrated in FIG. 2, one or more of the elements, processes and/or devices illustrated in FIG. 2 may be combined, divided, re-arranged, omitted, eliminated and/or implemented in any other way. Further, the example audience detector 200, the example content identifier 202, the example image sensor 204, the example people counter 206, the example time stamper 208, the example program detector 212, the example data communicator 214 and/or, more generally, the example audience measurement 102 of FIG. 2 may be implemented by hardware, software, firmware and/or any combination of hardware, software and/or firmware. Thus, for example, any of the example audience detector 200, the example content identifier 202, the example image sensor 204, the example people counter 206, the example time stamper 208, the example program detector 212, the example data communicator 214 and/or, more generally, the example audience measurement 102 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example audience detector 200, the example content identifier 202, the example image sensor 204, the example people counter 206, the example time stamper 208, the example program detector 212, the example data communicator 214 and/or, more generally, the example audience measurement 102 of FIG. 2 are hereby expressly defined to include a tangible computer readable medium such as a memory, DVD, CD, Blu-ray, etc. storing the software and/or firmware. Further still, the example audience measurement device 102 of FIG. 2 may include one or more elements, processes and/or devices in addition to, or instead of, those illustrated in FIG. 2, and/or may include more than one of any or all of the illustrated elements, processes and devices.

Figure 3:
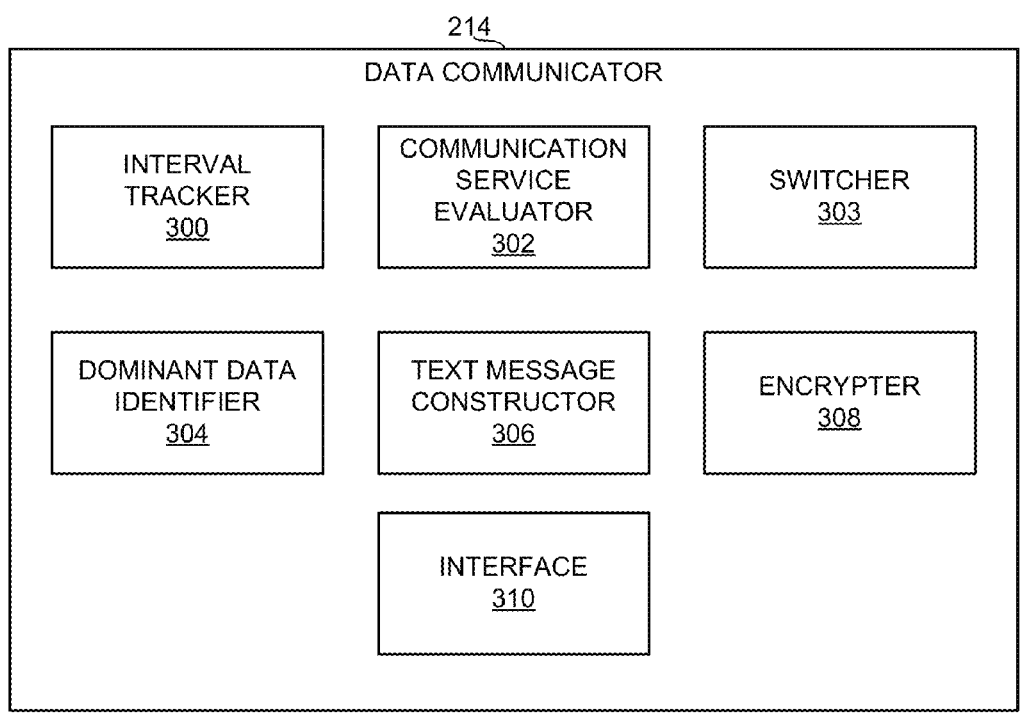
FIG. 3 is a block diagram of an example implementation of the example data communicator of FIG. 2.

FIG. 3 is a block diagram of an example implementation of the example data communicator 214 of FIG. 2. The example data communicator 214 of FIG. 3 is tasked with communicating data collected by the audience measurement device 102 to, for example, the central facility 120 of FIG. 1. Unlike previous audience measurement devices that relied strictly on standard data service protocols offered by cellular service providers to transmit collected data over a cellular network, the example data communicator 214 (in addition to or in lieu of the standard data service protocols) transmits collected data using a text-only protocol offered by cellular service providers at a much lower cost and with a higher rate of successful delivery. In particular, the example data communicator 214 of FIG. 3 incorporates data collected by the audience measurement device 102 into a text message for transmission via a text-only protocol, such as SMS, to the central facility 120. As described in detail below in connection with FIGS. 5 and 7, the central facility 120 is capable of receiving, parsing and interpreting such text messages. In some examples, an entity associated with the audience measurement device 102 (e.g., operators of the example central facility 120) purchases unlimited text messaging plans at rates much lower than the cost of standard data service plans, which often include charges per byte of data.

In the illustrated example of FIG. 3, the data communicator 314 communicates audience measurement data (e.g., people count(s) and/or media identifying information such as source identifier(s), signature(s), watermark(s), code(s), etc.) for defined periods of time over which the audience measurement data was detected. For example, the data communicator 214 of FIG. 3 conveys a first communication including audience measurement data that was collected over a first fifteen (15) minute period of time, and a second communication including audience measurement data that was collected over a second fifteen (15) minute period of time. The example data communicator 214 can use any suitable period of time corresponding to, for example, granularity requirements and/or cost concerns. To enable a user (e.g., an administrator associated with the entity operating the central facility 120) to define or set the period of time, the example data communicator 214 includes an interval tracker 300. The example interval tracker 300 of FIG. 3 maintains a clock and/or counter to define the period of time for the data communicator 214. When a defined period of time has elapsed according to the clock or counter, the example interval tracker 300 triggers operations of the data communicator 214 described in detail below. The clock and/or counter maintained by the example interval tracker 300 can be adjusted to alter the length of the periods of time for which collected data is transmitted.

In the illustrated example of FIG. 3, the audience measurement device 102 in which the data communicator 214 is implemented includes the ability to transmit messages via a cellular component according to first and second different protocols. The first protocol via which the data communicator 214 can communicate data corresponds to a standard data service offered by a cellular service provider. The standard data service (e.g., CDMA, LTE, (UMTS), 3G, 4G, etc.) enables the data communicator 214 to transmit and receive large amounts of data, such as web pages, audio, video, electronic mail messages, etc. of any suitable size. In contrast, the second protocol via which the data communicator 214 can communicate corresponds to a text-only messaging service. The text-only messaging service (e.g., SMS) enables the data communicator 214 to transmit and receive messages including only textual characters and of a capped size (e.g., in terms of bytes or number of characters), such as one hundred forty (140) bytes or one hundred sixty (160) characters.

To determine which one of the first and second protocols via which the data communicator 214 is to communicate information at a given time, the example data communicator 214 includes a communication service evaluator 302. In the illustrated example, the data communicator 214 indicates whether the first or second protocol should be used depending on an evaluation of one or more conditions associated with the first protocol and/or second protocol (and/or additional or alternative protocols utilized by the data communicator 214). Example conditions evaluated by the communication service evaluator 302 include a schedule (e.g., based on time of day which may be selected based on rate charges per time of day), an availability of the first protocol (e.g., the standard data service), a reliability (e.g., likelihood of successfully delivering data) of the first protocol, etc. For example, the communication service evaluator 302 may test the standard data service to determine whether use of the standard data service is likely (e.g., beyond a threshold percentage) to be successful in delivering message(s) (e.g., based on signal strength). If the standard data service is unlikely to successfully deliver message(s) at a given time (e.g., the audience measurement is not in a coverage area of the standard data service protocol, the signal strength is less than a threshold, such as a certain percentage of the maximum expected signal strength, etc.), if a schedule indicates that the standard data service is not to be used (e.g., due to costs), and/or the standard data service is not be used for any other suitable reason, the example communication service evaluator 302 indicates that the second protocol (e.g., the text-only messaging service) is to be used to communicate the data. In other words, the example communication service evaluator 302 of FIG. 3 evaluates one or more conditions associated with the standard data service and indicates that the text-only messaging service is to be used when the evaluated conditions meet one or more criteria (e.g., weak signal strength, unavailability, etc.).

The example communication service evaluator 302 conveys an output or instruction (e.g., a decision between the first and second protocol) to a switcher 303. The example switcher 303 of FIG. 3 tracks a current protocol that is currently used by the example data communicator 214 to transmit audience measurement information to the central facility 120. If the protocol selected by the communication service evaluator 302 differs from the current protocol, the example switcher 303 changes the current protocol that the data communicator 214 uses to communicate audience measurement data to the central facility 120. Otherwise, the example switcher 303 of FIG. 3 does not switch the protocol. Thus, the example switcher 303 of FIG. 3 implements the decision made by the example communication service evaluator 302 regarding which protocol (e.g., a standard data service protocol or a text-only messaging protocol) is to be used to communicate particular audience measurement data.

In some examples, the audience measurement device 102 in which the data communicator 214 is implemented does not have the standard data service available (e.g., the corresponding data plan has not been purchased and/or otherwise enabled). In such instances, the example communication service evaluator 302 and/or the example switcher 303 may be omitted or continuously set to indicate that the text-only messaging service is to be used to communicate data. In some examples, the communication service evaluator 302 and/or the example switcher 303 may choose from additional or alternative protocols (e.g., Wi-Fi, Ethernet, etc.) to communicate audience measurement data and/or other types of data.

The example data communicator 214 of FIG. 3 also includes a dominant data identifier 304 to determine which piece of media identifying information (referred to herein as a media identifier) was most frequently detected during the corresponding period of time (e.g., the first or second fifteen (15) minute period of time of the above example). As described above in connection with FIG. 2, the program detector 212 detects media identifiers (e.g., channel numbers, program names, codes, signatures, metadata, etc.) of media (e.g., content and/or advertisements) presented at a monitored collection site. Further, as described above in connection with FIG. 2, the program detector 212 stores the detected media identifiers in the memory 210 in conjunction with time stamps. To identify which of the media identifier(s) detected during a particular period of time was most frequently detected, the example dominant data identifier 304 accesses the portion(s) of the memory 210 corresponding to that particular period of time. In the illustrated example, the interval tracker 300 triggers the dominant data identifier 304 to access the memory 210 after the defined period of time has expired and/or been reached.

The dominant media identifier is the channel number, code, signature, watermark, source identifier (e.g., broadcast station, URL, device identifier (e.g., Bluray player), etc.), or other data collected most often during the period of time defined by the example interval tracker 300. Thus, to identify the dominant media identifier, the example dominant data identifier 304 accesses the memory 210 by submitting a query having parameters relatable to the time stamps stored in connection with the collected media identifying data. The example dominant data identifier 304 of FIG. 3 counts how many times each of the obtained media identifiers was collected during the first period of time. The example dominant data identifier 304 of the illustrated example determines which of the counts is the highest and marks and/or stores the corresponding media identifier as the dominant one for the corresponding period of time. Thus, the example dominant data identifier 304 of FIG. 3 identifies a particular piece of media that was detected by the audience measurement device 102 more than any other piece of media during periods of time defined by the interval tracker 300.

In the illustrated example of FIG. 3, when the text-only messaging service is to be used to communicate data, the example data communicator 214 utilizes the dominant media identifier to adhere to the capped size enforced by the text messaging protocol. In particular, the example data communicator 214 generates a text message via a text message constructor 306 including the dominant media identifier as calculated by the dominant data identifier 304. That is, for a particular collection period of time (e.g., the previous fifteen (15) minutes), the example text message constructor 306 obtains the dominant media identifier and incorporates the media identifier into a text message that represents the particular collection period of time. Thus, the example text message constructor 306 generates a text message having information indicative of which piece of media was watched most frequently during the particular period of time. In the illustrated example of FIG. 3, the text message constructor 306 omits the non-dominant media identifiers (e.g., media identifiers detected less frequently than the dominant media identifier) collected over the period of time from the text message, thereby significantly reducing the amount of data in the text message. The example text message constructor 306 of FIG. 3 can include additional information in the text message such as, for example, the time stamp associated with the dominant media identifier and/or a people count associated with the dominant media identifier. In some examples, the text message constructor 306 utilizes a template and/or one or more fields to generate the text message according to an expected format. Although a less granular amount of media measurement data is sent via the text-only messaging than via the standard data service protocol, the less granular data is better than having no data which would be the result in many situations due to the cost and/or unreliability of the standard data service.

Figure 4:
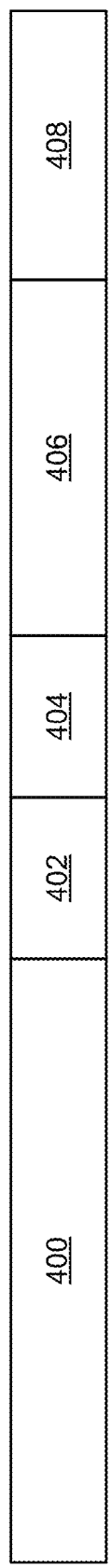
FIG. 4 is an illustration of an example text message format utilized by the example data communicator of FIG. 2.

One such example format is shown in FIG. 4 that includes a plurality of fields designated for particular types of information. The example format of FIG. 4 includes a first field 400 of a first number of characters or bytes designated to include the identified dominant media identifier for a corresponding period of time. The example format of FIG. 4 includes a second field 402 of a second number of characters or bytes designated to include the period of time corresponding to the dominant media identifier. The example format of FIG. 4 includes a third field 404 of a third number of characters or bytes designated to include a people count. The example format of FIG. 4 includes a fourth field 406 of a fourth number of characters or bytes designated to include identification information associated with the example household 100 of FIG. 1. The example format of FIG. 4 includes a fifth field 408 designated to include miscellaneous information. Additional or alternative formats, fields, numbers of characters or bytes, and/or types of information can be utilized by the example data communicator 214 of FIGS. 1 and/or 2.

A device (e.g., a message parser) associated with the central facility 120 recognizes which portion(s) or field(s) of the text message are to include, for example, the dominant media identifier, which portion(s) or field(s) of the text message are to include the time stamp, which portion(s) or field(s) of the text message are to include the people count, etc. An example message parser of the example central facility 120 of FIGS. 1 and/or 2 is described below in connection with FIGS. 5 and 7.

The example data communicator 214 of FIG. 3 includes an encrypter 308 to encrypt one or more aspects or portions of the text messages generated by the text message constructor 306. In such instances, the example central facility 120 has access to an encryption key (e.g., a public key of a public-private key pair) and/or other mechanism capable of decrypting the encrypted text messages.

The example data communicator 214 of FIG. 3 includes an interface 310 to communicate the audience measurement data to, for example, the central facility 120. The example interface 310 includes a modem and/or the cellular component to transmit and receive messages via a standard data service protocol and/or the text-only messaging service protocol described above. The example interface 310 receives instruction(s) from the example switcher 303 regarding which protocol is to be used to communicate audience measurement information. In some instances, when the standard data service protocol is to be used to communicate data (e.g., when the standard data service is available and/or scheduled for use), the example interface 310 facilitates communication of audience measurement data via the standard data service. The audience measurement data communicated via the standard data service protocol can include the dominant media identifier of the corresponding time and/or all of the media identifiers collected during the corresponding time.

Alternatively, when the text-only messaging service protocol is to be used to communicate data (e.g., when the standard data service is unavailable and/or when the text-only messaging service is scheduled for use), the example interface 310 facilitates communication of audience measurement data via the text-only message service. The audience measurement data communicated via the text-only messaging service protocol includes the dominant media identifier for the corresponding period of time, the corresponding time stamp, and/or the corresponding people count. In some examples, the data communicator 214 only sends audience measurement data via the text-only messaging service and does not utilize a standard data service plan.

Figure 5:
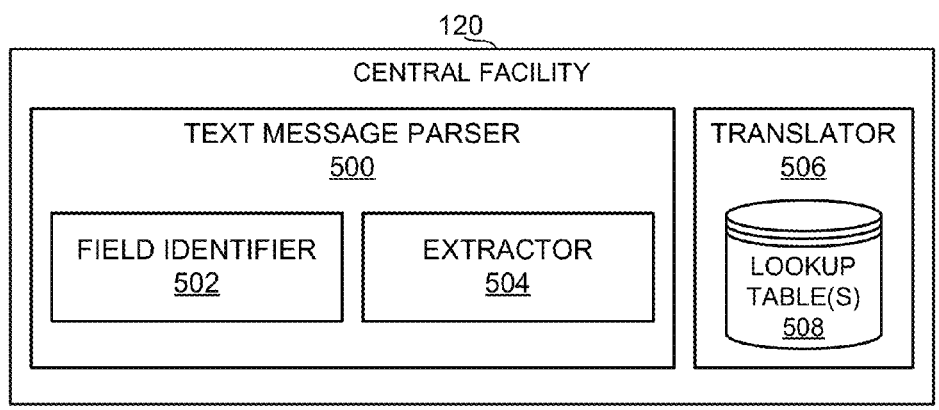
FIG. 5 is a block diagram of an example implement of the example central facility of FIGS. 1 and/or 2.

FIG. 5 is a block diagram of an example implementation of the example central facility of FIGS. 1 and/or 2. To process text messages received from the data communicator 214 of FIGS. 2 and/or 3, the example central facility 120 of FIG. 5 includes a text message parser 500. The example text message parser 500 includes a field identifier 502 to determine which portion of received text message correspond to which type of audience measurement information. In some examples, the data communicator 214 and the field identifier 502 exchange information regarding the field designations used by the text message constructor 306 to generate the text message to be conveyed via the text-only messaging service. In such instances, the example field identifier 502 stores and uses the designation information to identify the different fields of received text messages. For example, the field identifier 502 stores an indication that the first field 400 of FIG. 4 corresponds to a dominant media identifier and that the second field 402 of FIG. 4 corresponds to a time stamp or period of time associated with the dominant media identifier of the first field 400.

The example field identifier 502 conveys the field identification information to an example extractor 504 of the example text message parser 500. The example extractor 504 analyzes the fields identified in the received information to determine, for example, whether the fields include valid data (e.g., data corresponding to the expected format). Further, the example extractor 504 extracts the information from the fields (e.g., when the data is determined to be valid). For example, the extractor 504 extracts a media identifier from the first field 400 of FIG. 4 and recognizes that the extracted media identifier is a dominant one collected over a period of time. Further, the example extractor 504 recognizes extracts the time stamp information from the second field of FIG. 4 and recognizes that the time stamp information is associated with the period of time for which the extracted media identifier was dominant (e.g., the most frequently detected identifier).

The example extractor 504 of FIG. 5 conveys the extracted data to the example server 122 of FIG. 1 for further analysis and/or the example database 124 of FIG. 1 for storage. In some examples, the extractor 504 additionally or alternatively conveys the extracted information to a translator 506 of the central facility 120. The example translator 506 of FIG. 5 translates the extracted media identifier into more specific source identification information than the media identifier itself. For example, the dominant media identifier extracted from the text message may include a channel number and a time stamp. In such instances, the example translator 506 of FIG. 5 performs a lookup in one or more lookup tables 508 to determine which program was presented on the identified channel at a time corresponding to the time stamp. As a result, the example text message utilized by the example data communicator 214 to communicate audience measurement data can adhere to bandwidth restrictions by including smaller data in, for example, the first field 400 of the text message with the expectation that the central facility 120 is to be able to translate the smaller data into specific source information. Additional or alternative types of translation, such as signature, watermark, and/or identification code translation(s) are provided by the example translator 506 of FIG. 5.

While an example manner of implementing the data communicator 214 of FIG. 2 has been illustrated in FIG. 3, one or more of the elements, processes and/or devices illustrated in FIG. 3 may be combined, divided, re-arranged, omitted, eliminated and/or implemented in any other way. Further, the example interval tracker 300, the example communication service evaluator 302, the example switcher 303, the example dominant data identifier 304, the example text message constructor 306, the example encrypter 308, the example interface 310 and/or, more generally, the example data communicator 214 of FIG. 3 may be implemented by hardware, software, firmware and/or any combination of hardware, software and/or firmware. Thus, for example, any of the example interval tracker 300, the example communication service evaluator 302, the example switcher 303, the example dominant data identifier 304, the example text message constructor 306, the example encrypter 308, the example interface 310 and/or, more generally, the example data communicator 214 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example interval tracker 300, the example communication service evaluator 302, the example switcher 303, the example dominant data identifier 304, the example text message constructor 306, the example encrypter 308, the example interface 310 and/or, more generally, the example data communicator 214 of FIG. 3 are hereby expressly defined to include a tangible computer readable medium such as a memory, DVD, CD, Blu-ray, etc. storing the software and/or firmware. Further still, the example data communication 214 of FIG. 3 may include one or more elements, processes and/or devices in addition to, or instead of, those illustrated in FIG. 3, and/or may include more than one of any or all of the illustrated elements, processes and devices.

While an example manner of implementing the central facility 120 of FIGS. 1 and/or 2 has been illustrated in FIG. 5, one or more of the elements, processes and/or devices illustrated in FIG. 5 may be combined, divided, re-arranged, omitted, eliminated and/or implemented in any other way. Further, the example text message parser 500, the example field identifier 502, the example extractor 504, the example translator 506, and/or, more generally, the example central facility 120 of FIG. 5 may be implemented by hardware, software, firmware and/or any combination of hardware, software and/or firmware. Thus, for example, any of the example text message parser 500, the example field identifier 502, the example extractor 504, the example translator 506, and/or, more generally, the example central facility 120 of FIG. 5 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example text message parser 500, the example field identifier 502, the example extractor 504, the example translator 506, and/or, more generally, the example central facility 120 of FIG. 5 are hereby expressly defined to include a tangible computer readable medium such as a memory, DVD, CD, Blu-ray, etc. storing the software and/or firmware. Further still, the example central facility 120 of FIG. 5 may include one or more elements, processes and/or devices in addition to, or instead of, those illustrated in FIG. 5, and/or may include more than one of any or all of the illustrated elements, processes and devices.

Figure 6:
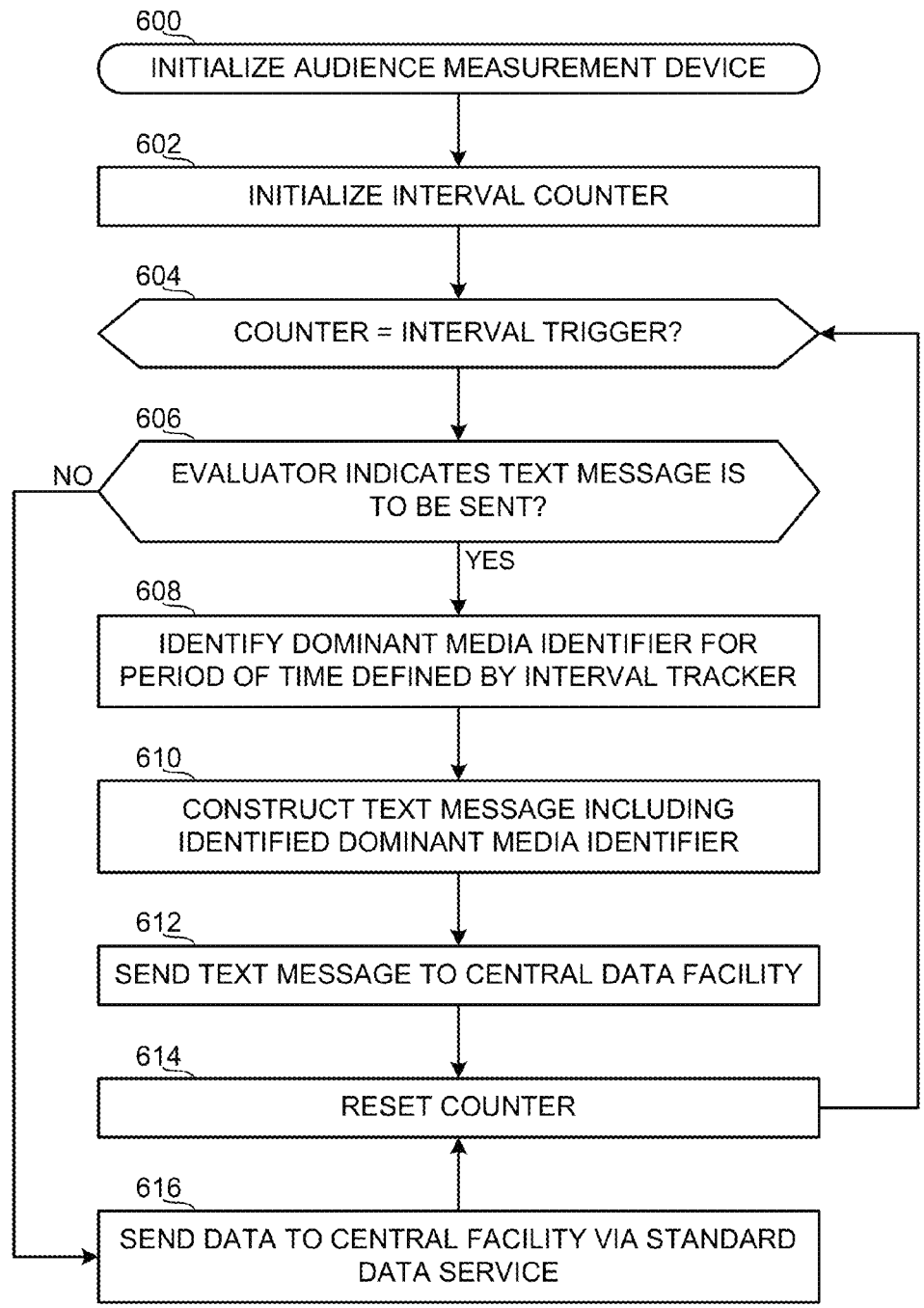
FIG. 6 is a flowchart illustrating example machine readable instructions that may be executed to implement the example data communicator of FIGS. 2 and/or 3.
Figure 7:
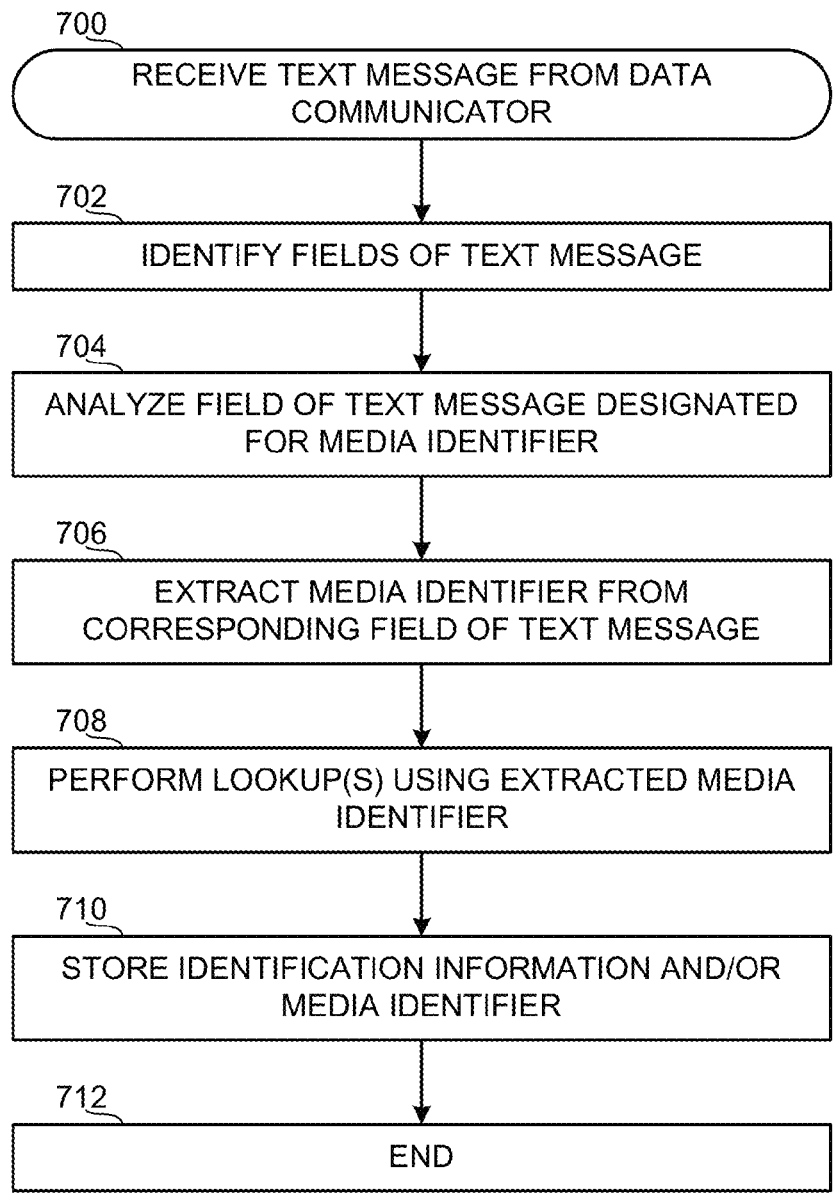
FIG. 7 is a flowchart illustrating example machine readable instructions that may be executed to implement the example central facility of FIGS. 1 and/or 2.

A flowchart representative of example machine readable instructions for implementing the data communicator 214 of FIGS. 2 and/or 3 is shown in FIG. 6. A flowchart representative of example machine readable instructions for implementing the central facility of FIGS. 1, 2 and/or 5 is shown in FIG. 7. In these examples, the machine readable instructions comprise programs for execution by a processor such as the processor 812 shown in the example processor platform 800 discussed below in connection with FIG. 8. The programs may be embodied in software stored on a tangible computer readable medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 6 and 7, many other methods of implementing the example data communicator 214 and/or the example central facility may alternatively be used. For example, the order of execution of the blocks may be changed, and/or some of the blocks described may be changed, eliminated, or combined.

As mentioned above, the example processes of FIGS. 6 and/or 7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6 and/or 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example of FIG. 6 begins with an initiation of the example audience measurement device 102 of FIGS. 1 and/or 2 (block 600). As described in connection with FIG. 2, the example audience measurement device collects media identifying information and/or people counts associated with a monitored environment (e.g., a living room of the example household 100 of FIG. 1). In addition to the collection of audience measurement information, the example audience measurement device 102 conveys the collected device to, for example, the central facility 120 of FIGS. 1, 2 and/or 5. In the example of FIG. 6, the audience measurement data collected during defined periods of time (or a summary thereof) is transmitted to the central facility 120 via the example data communicator 214 of FIGS. 2 and/or 3.

To enforce the defined periods of time for which the collected audience measurement device is conveyed, the example interval tracker 300 maintains information related to periods of time in connection with the collection of the data. In the example of FIG. 6, the interval tracker 300 is initialized in conjunction with the initialization of the audience measurement device 102 (block 602). When the clock or counter of the interval tracker 300 has reached a trigger (e.g., the defined period of time has expired) (block 604), the example data communicator 214 determines which communication protocol the data communicator 214 is to use for transmission of the collected audience measurement data (block 606). In the illustrated example, the communication service evaluator 302 determines whether a standard data service protocol or a text-only messaging service protocol is to be used to communicate the collected information. If the communication service evaluator 302 indicates that the standard data service protocol is to be used (block 606), the example switch 303 facilitates the communication (e.g., via the interface 310) of collected audience measurement data (e.g., as stored at the memory 210 of FIG. 2) to the central facility 120 via the standard data service protocol (block 616).

If the communication service evaluator 302 indicates that the text-only messaging service protocol is to be used to communicate the audience measurement data (block 606), the example dominant data identifier 304 accesses the memory 210 to obtain the media identifying information collected over the corresponding period of time (block 608). The example dominant data identifier 304 counts how many times each of the obtained media identifiers was detected during the corresponding period of time (block 608). The example dominant data identifier 304 determines that the media identifier having the greatest count corresponds to most frequently viewed piece of media during the period of time. Although a less granular amount of media measurement data is sent via the text-only messaging than via the standard data service protocol, the less granular data is better than having no data which would be the result in many situations due to the cost and/or unreliability of the standard data service.

The example text message constructor 306 generates a text message and incorporates the dominant media identifier in the text message (block 610). The example text message constructor 306 may incorporate additional or alternative audience measurement data such as, for example, the corresponding time stamp(s), the corresponding people count, an identifier of the household 100, etc. When the text message has been constructed, the example switch 303 facilitates communication (e.g., via the interface 310) of the text message to the central facility 120 (block 612). The counter maintained by the example interval tracker 300 is reset and control returns block 604.

FIG. 7 begins with the example central facility of FIGS. 1, 2 and/or 5 receiving a text message from the example data communicator 214 of FIGS. 2 and/or 3 (block 700). The example central facility 120 of FIG. 5 includes the text message parser 500 to process such text message and the translator 506 to interpret data extracted from the text message by the text message parser 500. As the received text message includes a plurality of fields, such as the fields 400-406 of FIG. 4, each designating for a particular type of information, the example field identifier 502 of the text message parser 500 identifies which portions of the received text message corresponds to which types of information (block 702). In the illustrated example, the extractor 504 of the text message parser 500 analyzes the identified fields of the received text message to determine, for example, whether the field include valid data (e.g., data conforming to an expected format) (block 704). The example extractor 504 extracts data from one or more of the fields 400-406 of the received text message. In the illustrated example of FIG. 7, the extractor 504 extracts the media identifier from the corresponding one of the fields (e.g., the first field 400 of FIG. 4) (block 706). Additional or alternative types of information can be extracted from additional or alternative ones of the fields.

The example translator 506 uses the extracted information to perform one or more translations. In the illustrated example, the translation(s) performed by the translator 506 include lookup(s) in the lookup table(s) 508 to determine, for example, source information associated with the extracted media identifier (block 708). The source information developed from the extracted media identifier is indicative of, for example, a program broadcast on a particular channel, a movie, a video game, a song, a stream presented on a web page, etc. The source identification information, the extracted media identifier, and/or any additional or alternative information extracted and/or developed from the received text message is stored at the central facility 120 (block 710). The example of FIG. 7 then ends (block 712).

Figure 8:
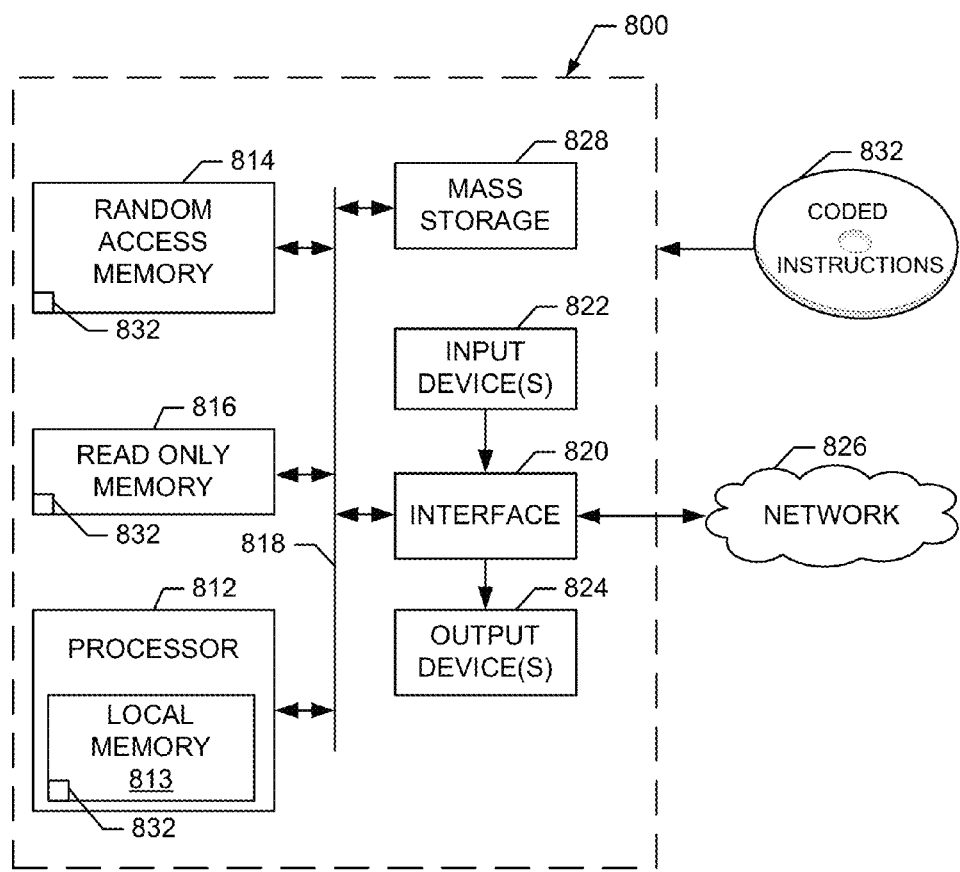
FIG. 8 is a block diagram of an example processing system capable of executing the example machine readable instructions of FIG. 6 to implement the example audience measurement device of FIGS. 1, 2 and/or 3 and/or the example machine readable instructions of FIG. 7 to implement the example central facility of FIGS. 1, 2 and/or 5.

FIG. 8 is a block diagram of an example processor platform 800 capable of executing the instructions of FIG. 6 to implement the data communicator 214 of FIGS. 2 and/or 3 and/or the instructions of FIG. 7 to implement the central facility 120 of FIGS. 1, 2, and/or 5. The processor platform 800 can be, for example, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The processor platform 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 1024 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device (e.g., the interface 310 of FIG. 3) such as a modem or network interface card to facilitate exchange of data with external computers via a network 826 (e.g., an Ethernet connection, a digital subscriber line (DSL), a telephone line, coaxial cable, a cellular telephone system, etc.).

The processor platform 800 also includes one or more mass storage devices 828 for storing software and data. Examples of such mass storage devices 828 include floppy disk drives, hard drive disks, compact disk drives and digital versatile disk (DVD) drives. The mass storage device 828 may implement the memory 210 of FIG. 2.

Coded instructions 832 (e.g., the machine readable instructions represented in FIGS. 6 and/or 7) may be stored in the mass storage device 828, in the volatile memory 814, in the non-volatile memory 816, and/or on a removable storage medium such as a CD or DVD.

An example method includes analyzing, via a processor, a plurality of media identifiers collected over a first period of time to identify a dominant one of the media identifiers for the first period of time; and communicating the dominant media identifier for the first period of time via a text-only messaging service to a storage facility. In some examples, communicating the dominant media identifier via the text-only messaging service comprises incorporating the dominant media identifier into a text message and omitting non-dominant ones of the media identifiers from the text message. In some examples, the text-only messaging service includes a restriction on a payload size for messages sent via the text-only messaging service. In some examples, the text-only messaging service is part of a subscription that includes a cellular data service plan. In some examples, communicating the dominant one of the media identifiers to the storage facility occurs in response to an unavailability of transmission via the cellular data service plan. In some examples, identifying the dominant one of the media identifiers comprises determining which of the media identifiers was most frequently detected over the period of time at the collection device. In some examples, at least one of the media identifiers comprises at least one of a channel number, a signature, a watermark, a program name, metadata or a source identification code.

An example tangible machine readable storage medium comprises instructions that, when executed, cause a machine to analyze a plurality of media identifiers collected over a first period of time to identify a dominant one of the media identifiers for the first period of time; and communicate the dominant media identifier for the first period of time via a text-only messaging service to a storage facility. In some examples, the instructions cause the machine to communicate the dominant media identifier via the text-only messaging service by incorporating the dominant media identifier into a text message and omitting non-dominant ones of the media identifiers from the text message. In some examples, the text-only messaging service includes a restriction on a payload size for messages sent via the text-only messaging service, and the text-only messaging service is part of a subscription that includes a cellular data service plan. In some examples, the instructions cause the machine to communicate the dominant one of the media identifiers to the storage facility in response to an unavailability of transmission via the cellular data service plan. In some examples, the instructions cause the machine to identify the dominant one of the media identifiers by determining which of the media identifiers was most frequently detected over the period of time at the collection device. In some examples, at least one of the media identifiers comprises at least one of a channel number, a signature, a watermark, a program name, metadata or a source identification code.

An example apparatus includes a detector to detect media identifying information over a plurality of periods of time; an identifier to determine which of the media identifying information was most frequently detected during a first one of the periods of time; and a text message constructor to incorporate the most frequently detected media identifying information into a text message to be communicated to a remote device via a text-only messaging service. In some examples, the text message constructor is to omit the media identifying information detected less frequently than the most frequently detected media identifying information. In some examples, the apparatus further comprises an encrypter to encrypt the text message before transmission to the remote device. In some examples, the text-only messaging service includes a restriction on a payload size for messages sent via the text-only messaging service. In some examples, the apparatus further comprises a cellular component to facilitate transmission of the text message via the text-only messaging service. In some examples, the text message constructor is to incorporate a people count and a time stamp corresponding to the most frequently detected media identifier into the text message. In some examples, at least one of the media identifiers comprises at least one of a channel number, a signature, a watermark, a program name, metadata or a source identification code.

An example method includes evaluating, via a processor, one or more conditions associated with a first communication protocol of a device, the first communication protocol capable of transmitting a first amount of data, the device including a second communication protocol capable of transmitting a second amount of data less than the first amount of data; and, when the evaluated one or more conditions meet a first criteria in connection with a plurality of piece of collected data, identifying a dominant one of the pieces of collected data and using the second communication protocol to communicate the dominant piece of data to a second device different from the first device. In some examples, the method further comprises using the first communication protocol to communicate the data to the second device when the evaluated one or more conditions meet a second criteria. In some examples, the first criteria comprises the first protocol being unavailable for communication, and the second criteria comprises the first protocol being available for communication. In some examples, the first criteria comprises the first protocol being unlikely to successfully deliver the data to the second device, and the second criteria comprises the first protocol being likely to successfully deliver the data to the second device. In some examples, the collected pieces of data comprise audience measurement data collected by the device, and the second device is associated with a central facility of an audience measurement entity. In some examples, the second communication protocol facilitates a text-only messaging service.

An example tangible machine readable storage medium comprising instructions that, when executed, cause a machine to evaluate one or more conditions associated with a first communication protocol of a device, the first communication protocol capable of transmitting a first amount of data, the device including a second communication protocol capable of transmitting a second amount of data less than the first amount of data; and when the evaluated one or more conditions meet a first criteria in connection with a plurality of piece of collected data, identify a dominant one of the pieces of collected data and use the second communication protocol to communicate the dominant piece of data to a second device different from the first device. In some examples, the instructions cause the machine to use the first communication protocol to communicate the data to the second device when the evaluated one or more conditions meet a second criteria. In some examples, the first criteria comprises the first protocol being unavailable for communication, and the second criteria comprises the first protocol being available for communication. In some examples, the first criteria comprises the first protocol being unlikely to successfully deliver the data to the second device, and the second criteria comprises the first protocol being likely to successfully deliver the data to the second device. In some examples, the collected pieces of data comprise audience measurement data collected by the device, and the second device is associated with a central facility of an audience measurement entity. In some examples, the second communication protocol facilitates a text-only messaging service.

An example apparatus includes a switcher to set a communication protocol to be used to communicate data from a device, wherein the device is capable of transmitting information via a first communication protocol capable of transmitting a first amount of data, and the device is capable of transmitting information via a second communication protocol capable of transmitting a second amount of data less than the first amount of data; an identifier to identify a dominant one of a plurality of identifiers collected over a period of time; and an evaluator to evaluate one or more conditions associated with the first communication protocol, wherein the switcher is to set the device to transmit the dominant identifier to a second device when the evaluated one or more conditions meet a first criteria, and wherein the switcher is to set the device to transmit each of the plurality of identifiers to the second device when the evaluated one or more conditions meet a second criteria. In some examples, transmitting the dominant identifier to the second device when the evaluated one or more conditions meet the first criteria comprises communicating the dominant identifier via the second communication protocol. In some examples, the second communication protocol facilitates a text-only messaging service. In some examples, transmitting each of the identifiers to the second device when the evaluated one or more conditions meet the second criteria comprises communicating each of the identifiers via the first protocol. In some examples, the first communication protocol facilitates a standard data service. In some examples, the first criteria comprises the first protocol being unavailable for communication, and the second criteria comprises the first protocol being available for communication. In some examples, the first criteria comprises the first protocol being unlikely to successfully deliver data to the second device, and the second criteria comprises the first protocol being likely to successfully deliver data to the second device. In some examples, the identifiers comprise audience measurement data collected by the device, and the second device is associated with a central facility of an audience measurement entity.

An example method includes collecting media identifiers over a period of time; identifying a first one of the media identifiers that was most frequently detected over the period of time; and incorporating, via a processor, the first one of the media identifiers into a first portion of a text message for communication to a second device. In some examples, the method further comprises incorporating a people count into a second portion of the text message. In some examples, the first portion of the text message is designated to receive media identifiers according to a format, and the second portion of the text message is designated to receive people counts according to the format. In some examples, a determination that a standard data service is unavailable or unlikely to successfully delivery data triggers the incorporation of the first media identifier into the text message. In some examples, the method further comprises transmitting the text message to a central facility via a text-only message service.

An example tangible machine readable storage medium comprising instructions that, when executed, cause a machine to collect media identifiers over a period of time; identify a first one of the media identifiers that was most frequently detected over the period of time; and incorporate the first one of the media identifiers into a first portion of a text message for communication to a second device. In some examples, the instructions cause the machine to incorporate a people count into a second portion of the text message. In some examples, the first portion of the text message is designated to receive media identifiers according to a format, and the second portion of the text message is designated to receive people counts according to the format. In some examples, a determination that a standard data service is unavailable or unlikely to successfully delivery data triggers the incorporation of the first media identifier into the text message. In some examples, the instructions cause the machine to transmit the text message to a central facility via a text-only message service.

An example apparatus includes a detector to collect media identifiers over a period of time; an identifier a first one of the media identifiers that was most frequently detected over the period of time; and a constructor to incorporate the first one of the media identifiers into a first portion of a text message for communication to a second device. In some examples, the constructor is to incorporate a people count into a second portion of the text message. In some examples, the first portion of the text message is designated to receive media identifiers according to a format, and the second portion of the text message is designated to receive people counts according to the format. In some examples, a determination that a standard data service is unavailable or unlikely to successfully delivery data triggers the incorporation of the first media identifier into the text message. In some examples, the apparatus further comprises an interface to facilitate transmission of the text message to a central facility via a text-only message service.

An example method includes identifying which portion of a text message received from a device is designated to a media identifier, the media identifier being a most frequently detected one of a plurality media identifiers detected over a period of time at a device; extracting, via a processor, information from the identified portion of the text message; and storing the extracted information in a memory. In some examples, the method further comprises identifying which portion of the text message is designated to a people count, and extracting information from the people count portion of the text message. In some examples, the method further comprises translating the extracted media identifier to identify a source associated with the media identifier. In some examples, translating the extracted media identifier comprises searching a lookup table using the media identifier as a query. In some examples, the information extracted from the media identifier portion of the text message comprises one of a signature, a code, a watermark, or a channel number.

An example tangible machine readable storage medium comprises instructions that, when executed, cause a machine to identify which portion of a text message received from a device is designated to a media identifier, the media identifier being a most frequently detected one of a plurality media identifiers detected over a period of time at a device; extract information from the identified portion of the text message; and store the extracted information in a memory. In some examples, the instructions cause the machine to identify which portion of the text message is designated to a people count, and extract information from the people count portion of the text message. In some examples, the instructions cause the machine to translate the extracted media identifier to identify a source associated with the media identifier. In some examples, the instructions cause the machine to translate the extracted media identifier by searching a lookup table using the media identifier as a query. In some examples, the information extracted from the media identifier portion of the text message comprises one of a signature, a code, a watermark, or a channel number.

An example apparatus includes an identifier to identify which portion of a text message received from a device is designated to a media identifier, the media identifier being a most frequently detected one of a plurality media identifiers detected over a period of time at a device; an extractor to extract information from the identified portion of the text message; and a memory to store the extracted information. In some examples, the identifier is to identify which portion of the text message is designated to a people count, and the extractor is to extract information from the people count portion of the text message. In some examples, the apparatus further comprises a translator to translate the extracted media identifier to identify a source associated with the media identifier. In some examples, translating the extracted media identifier comprises searching a lookup table using the media identifier as a query. In some examples, the information extracted from the media identifier portion of the text message comprises one of a signature, a code, a watermark, or a channel number.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method, comprising:
    analyzing, via a processor, a plurality of media identifiers collected during a period of time;
    identifying, via the processor, a dominant media identifier from the plurality of media identifiers by determining which of the plurality of media identifiers was most frequently detected during the period of time;
    selecting, from the plurality of media identifiers, only the dominant media identifier for incorporation into a text message;
    incorporating the selected dominant media identifier into the text message and omitting all non-dominant ones of the plurality of media identifiers from the text message; and
    communicating the text message via a text messaging service to a storage facility.

2. A method as defined in claim 1, wherein the text messaging service includes a restriction on a payload size for messages sent via the text messaging service.

3. A method as defined in claim 1, wherein the text messaging service is part of a subscription that includes a cellular data service plan.

4. A method as defined in claim 3, wherein the communicating of the text message to the storage facility occurs in response to an unavailability of transmission via the cellular data service plan.

5. A method as defined in claim 1, wherein at least one of the plurality of media identifiers includes at least one of a channel number, a signature, a watermark, a program name, metadata or a source identification code.

6. A method as defined in claim 1, further including scheduling the period of time, wherein the plurality of media identifiers are analyzed in response to the period of time ending.

7. A method as defined in claim 1, further including communicating a people count and a time stamp corresponding to the dominant media identifier via the text message.

8. A tangible computer readable storage medium comprising instructions that, when executed, cause a machine to at least:
    analyze a plurality of media identifiers collected during a period of time;
    identify a dominant media identifier from the plurality of media identifiers by determining which of the plurality of media identifiers was collected most often during the period of time;
    generate a text message including the dominant media identifier and no other media identifier; and
    communicate the text message via a text messaging service to a storage facility.

9. A storage medium as defined in claim 8, wherein the text messaging service includes a restriction on a payload size for messages sent via the text messaging service, and the text messaging service is part of a subscription that includes a cellular data service plan.

10. A storage medium as defined in claim 9, wherein the instructions, when executed, cause the machine to communicate the text message to the storage facility in response to an unavailability of transmission via the cellular data service plan.

11. A storage medium as defined in claim 8, wherein the instructions, when executed, cause the machine to determine which of the plurality of media identifiers was collected most often by determining which of the media identifiers was most frequently detected during the period of time at a collection device implemented in a media exposure environment.

12. A storage medium as defined in claim 8, wherein at least one of the plurality of media identifiers includes at least one of a channel number, a signature, a watermark, a program name, metadata or a source identification code.

13. A storage medium as defined in claim 8, wherein the instructions, when executed, cause the machine to communicate a people count and a time stamp corresponding to the dominant media identifier via the text message.

14. An apparatus, comprising:
    a detector to detect a plurality of media identifiers over a plurality of periods of time;
    an identifier to determine which of the plurality of media identifiers was most frequently detected during one of the periods of time; and
    a text message constructor to:
        incorporate the most frequently detected media identifier into a text message to be communicated to a remote device via a text messaging service; and
        omit all of the plurality of media identifiers detected less frequently than the most frequently detected media identifier from the text message.

15. An apparatus as defined in claim 14, further including an encrypter to encrypt the text message before transmission to the remote device.

16. An apparatus as defined in claim 14, wherein the text messaging service includes a restriction on a payload size for messages sent via the text messaging service.

17. An apparatus as defined in claim 14, further including a cellular component to facilitate transmission of the text message via the text messaging service.

18. An apparatus as defined in claim 14, wherein the text message constructor is to incorporate a people count and a time stamp corresponding to the most frequently detected media identifier into the text message.

19. An apparatus as defined in claim 14, wherein the media identifier includes at least one of a channel number, a signature, a watermark, a program name, metadata or a source identification code.

* * * * *